(12) United States Patent
Sykes et al.

(10) Patent No.: US 12,240,106 B2
(45) Date of Patent: Mar. 4, 2025

(54) MANUAL OPERATION OF A REMOTE ROBOT ASSEMBLY

(71) Applicant: Altec Industries, Inc., Birmingham, AL (US)

(72) Inventors: Jonathan Westin Sykes, Gower, MO (US); Timothy J. Mourlam, Shawnee, KS (US); David Lindquist, Cameron, MO (US); William Naber, Saint Joseph, MO (US); Robert Nichols, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/368,155

(22) Filed: Sep. 14, 2023

(65) Prior Publication Data
US 2024/0033950 A1  Feb. 1, 2024

Related U.S. Application Data

(63) Continuation of application No. 17/875,674, filed on Jul. 28, 2022, now Pat. No. 11,794,359.

(51) Int. Cl.
*B25J 19/02* (2006.01)
*B25J 5/00* (2006.01)
(Continued)

(52) U.S. Cl.
CPC ............ *B25J 19/023* (2013.01); *B25J 5/00* (2013.01); *B25J 9/1689* (2013.01); *B25J 13/02* (2013.01);
(Continued)

(58) Field of Classification Search
CPC ......... B25J 19/023; B25J 13/00; H04N 23/66; H04N 23/695; H04N 13/282; H04N 13/27; H04N 13/254
See application file for complete search history.

(56) References Cited

U.S. PATENT DOCUMENTS

| | | |
|---|---|---|
| 1,050,004 A | 1/1913 | Jeremiah |
| 1,676,584 A | 7/1928 | Tideman |

(Continued)

FOREIGN PATENT DOCUMENTS

| | | |
|---|---|---|
| CN | 108789416 A | 11/2018 |
| CN | 113902990 A | 1/2022 |

(Continued)

OTHER PUBLICATIONS

U.S. Appl. No. 17/875,674, filed Jul. 28, 2022, Jonathan Westin Sykes (Continued)

*Primary Examiner* — Kathleen V Nguyen
(74) *Attorney, Agent, or Firm* — Erise IP, P.A.

(57) ABSTRACT

A system, method, and device for a remotely controlled robot unit affixed to a boom assembly. The robot unit comprises at least one arm for performing an action, a remotely controlled movable six-degree-of freedom camera mount, at least one camera disposed on the camera mount to capture visual information, and at least one depth camera disposed on the camera mount to capture three-dimensional depth information. Captured sensory information may be transmitted to an operator using a head mount and motion controls for controlling movement of the robot unit. Operator movement captured by the head mount and motion controls may be compared to a digital representation generated from the three-dimensional depth information to aid in positioning and moving the robot unit.

15 Claims, 10 Drawing Sheets

(51) Int. Cl.
*B25J 9/16* (2006.01)
*B25J 13/02* (2006.01)
*H04N 7/18* (2006.01)
*H04N 13/282* (2018.01)
*H04N 23/57* (2023.01)
*H04N 23/66* (2023.01)

(52) U.S. Cl.
CPC ........... *H04N 7/181* (2013.01); *H04N 13/282* (2018.05); *H04N 23/57* (2023.01); *H04N 23/66* (2023.01)

(56) References Cited

U.S. PATENT DOCUMENTS

| | | |
|---|---|---|
| 1,966,989 A | 7/1934 | Bernard |
| 2,662,730 A | 12/1953 | Crawford |
| 2,786,092 A | 3/1957 | Gage |
| 4,937,759 A | 6/1990 | Vold |
| 5,076,449 A | 12/1991 | Clutter |
| 5,215,202 A | 6/1993 | Fujimoto |
| 5,286,159 A | 2/1994 | Honma |
| 5,640,876 A | 6/1997 | Erwin |
| 5,782,440 A | 7/1998 | Ozga et al. |
| 6,527,405 B2 | 3/2003 | Hsieh |
| 9,203,219 B2 | 12/2015 | Devine et al. |
| 9,707,680 B1 | 7/2017 | Jules et al. |
| 9,727,053 B2 | 8/2017 | Ito |
| 10,105,853 B1 | 10/2018 | Hwang et al. |
| 10,589,433 B2 | 3/2020 | Nahwi et al. |
| 10,626,632 B2 | 4/2020 | Sauber et al. |
| 11,660,750 B1 | 5/2023 | Sykes et al. |
| 11,689,008 B1 | 6/2023 | Nichols et al. |
| 11,697,209 B1 | 7/2023 | Mourlam et al. |
| 11,717,969 B1 | 8/2023 | Mourlam et al. |
| 11,742,108 B1 | 8/2023 | Naber et al. |
| 11,749,978 B1 | 9/2023 | Lindquist et al. |
| 11,794,359 B1 | 10/2023 | Sykes et al. |
| 11,839,962 B1 | 12/2023 | Nichols |
| 2001/0055525 A1 | 12/2001 | Inokuchi et al. |
| 2002/0179559 A1 | 12/2002 | Hashiguchi et al. |
| 2003/0029215 A1 | 2/2003 | Latour |
| 2003/0174286 A1 | 9/2003 | Trumbull |
| 2004/0112207 A1 | 6/2004 | Price |
| 2004/0182235 A1 | 9/2004 | Hart |
| 2006/0045294 A1 | 3/2006 | Smyth et al. |
| 2007/0124024 A1* | 5/2007 | Okamoto ............... B25J 9/0003 700/245 |
| 2007/0192910 A1 | 8/2007 | Vu et al. |
| 2007/0291128 A1* | 12/2007 | Wang ..................... H04N 7/185 901/1 |
| 2008/0188986 A1 | 8/2008 | Hoppe |
| 2009/0088773 A1 | 4/2009 | Zhao et al. |
| 2009/0088897 A1 | 4/2009 | Zhao et al. |
| 2011/0036605 A1 | 2/2011 | Leong et al. |
| 2013/0011220 A1 | 1/2013 | Jacobsen et al. |
| 2013/0014852 A1 | 1/2013 | Hayden et al. |
| 2014/0014637 A1 | 1/2014 | Hunt et al. |
| 2014/0094968 A1 | 4/2014 | Taylor et al. |
| 2015/0015708 A1 | 1/2015 | Collett et al. |
| 2015/0044009 A1 | 2/2015 | Yang et al. |
| 2016/0239080 A1 | 8/2016 | Marcolina et al. |
| 2017/0340969 A1 | 11/2017 | Lim et al. |
| 2018/0011681 A1 | 1/2018 | Kada et al. |
| 2018/0243921 A1 | 8/2018 | Hashimoto et al. |
| 2019/0125462 A1 | 5/2019 | Peine et al. |
| 2019/0176334 A1 | 6/2019 | Zhou et al. |
| 2019/0201136 A1 | 7/2019 | Shelton, IV et al. |
| 2019/0222004 A1 | 7/2019 | Turnbull |
| 2019/0256335 A1 | 8/2019 | Araki |
| 2019/0257097 A1 | 8/2019 | Kawai et al. |
| 2020/0122321 A1 | 4/2020 | Khansari Zadeh et al. |
| 2021/0001483 A1 | 1/2021 | Milenkovic |
| 2021/0020337 A1 | 1/2021 | Ciapala et al. |
| 2021/0106342 A1 | 4/2021 | Blackwell |
| 2021/0252714 A1 | 8/2021 | Hayashi et al. |
| 2021/0269291 A1 | 9/2021 | Callaghan et al. |
| 2021/0273424 A1 | 9/2021 | Harvey et al. |
| 2021/0282871 A1* | 9/2021 | Prior ................... A61B 90/361 |
| 2021/0305790 A1 | 9/2021 | O'Connell et al. |
| 2021/0315590 A1 | 10/2021 | Chappuis et al. |
| 2021/0370509 A1 | 12/2021 | Pivac |
| 2022/0032476 A1* | 2/2022 | Robertson ............ B25J 11/0055 |
| 2022/0138612 A1 | 5/2022 | Vengertsev et al. |
| 2022/0203562 A1 | 6/2022 | Brown et al. |
| 2022/0212340 A1 | 7/2022 | Hasegawa et al. |
| 2022/0212345 A1 | 7/2022 | Smith et al. |
| 2022/0241975 A1* | 8/2022 | Tan ........................ B25J 9/1661 |
| 2022/0266449 A1 | 8/2022 | Hasegawa et al. |
| 2022/0287676 A1 | 9/2022 | Steines et al. |
| 2022/0288669 A1 | 9/2022 | Goodall et al. |
| 2022/0383531 A1* | 12/2022 | Santini .................. A61B 34/30 |
| 2023/0046644 A1 | 2/2023 | Themelis |
| 2023/0157525 A1 | 5/2023 | Hunter et al. |
| 2023/0200920 A1 | 6/2023 | Mittman |
| 2023/0270321 A1 | 8/2023 | Breton et al. |
| 2024/0033916 A1 | 2/2024 | Sykes et al. |
| 2024/0033925 A1 | 2/2024 | Mourlam et al. |
| 2024/0033928 A1 | 2/2024 | Mourlam et al. |
| 2024/0038413 A1 | 2/2024 | Naber et al. |
| 2024/0039254 A1 | 2/2024 | Lindquist et al. |
| 2024/0058935 A1 | 2/2024 | Nichols |

FOREIGN PATENT DOCUMENTS

| | | |
|---|---|---|
| JP | 6840052 | 3/2021 |
| KR | 102207182 B1 | 1/2021 |
| WO | 9532078 A1 | 11/1995 |
| WO | 2017220822 A1 | 12/2017 |
| WO | 2020203793 A1 | 10/2020 |

OTHER PUBLICATIONS

U.S. Appl. No. 17/875,796, filed Jul 28, 2022, Robert Nichols.
U.S. Appl. No. 17/875,821, filed Jul. 28, 2022, William Naber.
U.S. Appl. No. 17/875,990, filed Jul. 28, 2022, David F. Lindquist.
Aracil et al. "Teleoperated system for live power lines maintenance" Div. Ingenieria de Sistemas y Automatica (DISAM), Polytechnic University of Madrid, Spain.
IStock, "Lineman hanging new "pot" aka transformer on telephone pole stock photo", Apr. 22, 2016, https://www.istockphoto.com/photo/lineman-hanging-new-pot-aka-transformer-on-telephone-pole-gm951987990-259883755 (Year: 2016).
Owen-Hill, "3 types of robot singularities and how to avoid them," Mar. 2, 2016, Robohub.org, https://robohub.org/3-types-of-robot-singularities-and-how-to-avoid-them/ (Year: 2016).
PCT Patent Application PCT/US2023/028564 International Search Report and Written Opinion of the International Searching Authority, issued Nov. 22, 2023.
U.S. Appl. No. 17/875,990, Notice of Allowance dated Apr. 21, 2023.
U.S. Appl. No. 17/875,674, Final Office Action dated Feb. 15, 2023.
U.S. Appl. No. 17/875,674, Non-Final Office Action dated Oct. 13, 2022.
U.S. Appl. No. 17/875,674, Notice of Allowance and Interview Summary dated Jun. 16, 2023.
U.S. Appl. No. 17/875,743, Final Office Action dated Jan. 10, 2023.
U.S. Appl. No. 17/875,743, Non-Final Office Action dated Sep. 22, 2022.
U.S. Appl. No. 17/875,743, Notice of Allowance and Interview Summary dated Mar. 27, 2023.
U.S. Appl. No. 17/875,796, Non-Final Office Action dated Apr. 5, 2023.
U.S. Appl. No. 17/875,796, Notice of Allowance dated Aug. 2, 2023.
U.S. Appl. No. 17/875,990, Non-Final Office Action dated Feb. 9, 2023.
U.S. Appl. No. 18/385,545 Notice of Allowance issued Jul. 15, 2024.

(56) References Cited

OTHER PUBLICATIONS

U.S. Appl. No. 18/224,278 Non-Final Office Action issued Sep. 5, 2024.
U.S. Appl. No. 18/135,941 Non-Final Office Action issued Aug. 16, 2024.
U.S. Appl. No. 18/197,438 Notice of Allowance issued Aug. 5, 2024.

* cited by examiner

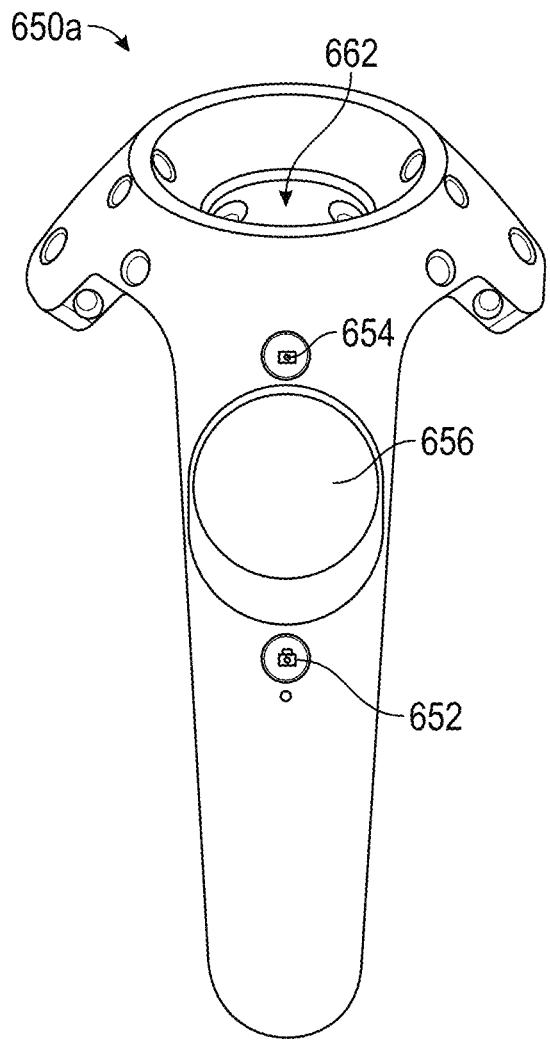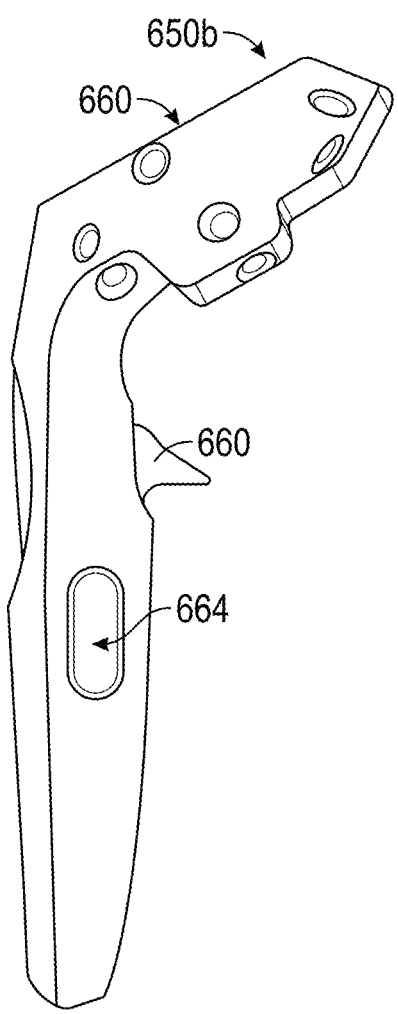
FIG. 6B
FIG. 6C

MANUAL OPERATION OF A REMOTE ROBOT ASSEMBLY

RELATED APPLICATIONS

This patent application is a continuation application claiming priority benefit, with regard to all common subject matter, of commonly assigned and concurrently filed U.S. patent application Ser. No. 17/875,674, filed Jul. 28, 2022, and entitled "MANUAL OPERATION OF A REMOTE ROBOT ASSEMBLY." The above-referenced patent application is hereby incorporated by reference in its entirety into the present application.

BACKGROUND

1. Field

Embodiments of the technologies provided herein relate to remote operation of machinery. More specifically, embodiments relate to a remotely controlled robot coupled to a 3-D imaging system for providing point cloud information while remotely operating machinery.

2. Related Art

Remote operation of machinery is desirable especially in hazardous environments and in locations where it would be difficult for a human to work. A significant challenge associated with performing remote operations is that the user does not have the same viewing perspective as they would during traditional work. Thus, it is difficult for a user to remotely operate machinery without the appropriate visual information associated with the machinery in a remote location.

Robots are commonplace in factory settings, particularly in assembly line operations in which the robot performs simple, repetitive actions in a controlled environment. However, in remote operations involving work on energized power lines or other similar scenarios, each job and environment is dynamic and different. Until a robot is positioned in the job site, it can be near impossible to determine the exact actions the robot will perform. Additionally, current visual technologies fail to adequately provide a user manually controlling a robot with adequate sensory information, particularly, current technologies fail to provide operators with adequate visual information about depth and positioning in a three-dimensional space.

Accordingly, a need exists for controllable robots that can properly respond to dynamic scenarios. Additionally, a need also exists for robots that can provide operators with sensory information about the depth and positioning in a three-dimensional space.

SUMMARY

Embodiments of the present disclosure solve the above-mentioned problems by providing a system and method for providing real-time sensory information associated with a remote location using a remote capture device and a head-mounted display. In some embodiments, the system comprises a fiber-optic cable to transmit a signal comprising sensory information collected by the remote capture device to the head-mounted display.

In some aspects, the techniques described herein relate to a boom-mounted robot unit for capturing real-time, sensory information to a user to allow for remote operation, the boom-mounted robot including: a base for mounting the robot unit to a distal end of a boom assembly; at least one arm for performing an action; a six-degree-of freedom camera mount; at least one camera disposed on the camera mount to capture visual information; at least one depth camera disposed on the camera mount to capture three-dimensional depth information; at least one remote power source for powering the at least one camera and the at least one depth camera; a transmitter for transmitting a signal including the visual information and the three-dimensional depth information to a hardware including a processor, the processor including computer readable instruction for performing: receiving the sensory information and creating a three-dimensional representation of an object based at least in part of the three-dimensional depth information; receiving an instruction for the robot unit to perform an action; responsive to receiving the instruction, comparing the instruction to the three-dimensional representation; and causing the robot unit to perform the action based at least in part on the instruction and a comparison of the instruction to the three-dimensional representation.

In some aspects, the techniques described herein relate to a boom-mounted robot unit, wherein the boom-mounted robot includes two utility arms, wherein each of the two utility arms are configured for moving with six degrees of freedom.

In some aspects, the techniques described herein relate to a boom-mounted robot unit, wherein the camera mount is configured for moving with six degrees of freedom.

In some aspects, the techniques described herein relate to a boom-mounted robot unit, wherein at least of one utility arm or the camera mount is at least partially constructed from an electric resistant material.

In some aspects, the techniques described herein relate to a boom-mounted robot unit, further including a plurality of cameras to capture video of a plurality of fields of view.

In some aspects, the techniques described herein relate to a boom-mounted robot unit, further including at least one sensor, wherein the at least one sensor is an electrical sensor.

In some aspects, the techniques described herein relate to a boom-mounted robot unit, wherein a proximal end of the boom assembly is attached to a utility vehicle.

In some aspects, the techniques described herein relate to a system for controlling a boom assembly mounted robot unit, the system including: a robot unit, the robot unit including: a base for mounting the robot unit to a boom assembly; a six-degree-of freedom camera mount; at least one camera disposed on the camera mount to capture visual information; at least one depth camera disposed on the camera mount to capture three-dimensional depth information; at least one remote power source for powering the at least one camera and the at least one depth camera; a control unit, the control unit including: a display for displaying the visual information; and a controller for inputting instruction for the robot unit; and a processor, the processor including computer readable instruction for performing: transmit the visual information to the display of the control unit; receive the three-dimensional depth information and create a three-dimensional representation of an object based at least in part of the three-dimensional depth information; receive an instruction for the robot unit; responsive to receiving the instruction, comparing the instruction to the three-dimensional representation; and cause the robot unit to perform an action based at least in part on the instruction and the comparing of the instruction to the three-dimensional representation.

In some aspects, the techniques described herein relate to a system, wherein the robot unit further includes: a first utility arm and a second utility arm, and wherein the controller of the control system includes a first hand-held controller and a second hand-held controller, wherein the first hand-held controller controls the first utility arm, and the second hand-held controller controls the second utility arm.

In some aspects, the techniques described herein relate to a system, wherein each of the first hand-held controller and the second hand-held controller include at least one sensor for recording movement data and angle data.

In some aspects, the techniques described herein relate to a system, wherein the display is disposed on a head mount for placement on a head of an operator.

In some aspects, the techniques described herein relate to a system, wherein the head mount includes at least one sensor for recording a viewing angle of the operator.

In some aspects, the techniques described herein relate to a system, wherein the six degree-of-freedom camera mount is configured to adjust a viewing angle based at least in part on the viewing angle of the operator.

In some aspects, the techniques described herein relate to a system, wherein the first hand-held controller includes a first transceiver, the second hand-held controller includes a second transceiver, and the head mount includes a third transceiver, and wherein each of the first transceiver, second transceiver, and third transceiver are configured for transmitting information to the robot unit.

In some aspects, the techniques described herein relate to a method of controlling a boom-mounted robot unit, the method including: causing a capturing of sensory information from at least one capture device disposed on a robot unit, wherein the sensory information include video captured from at least one camera and three-dimensional depth information captured from a three-dimensional depth camera; receiving the sensory information and creating a three-dimensional representation of an object based at least in part of the three-dimensional depth information; causing display of the video captured from the at least one camera on a display of a control system; receiving an instruction for the robot unit to perform an action from a user associated with the control system; responsive to receiving the instruction, comparing the instruction to the three-dimensional representation; and causing the robot unit to perform the action based at least in part on the instruction and a comparison of the instruction to the three-dimensional representation.

In some aspects, the techniques described herein relate to a method, further including: transmitting the sensory information to a computer, wherein the computer generates the three-dimensional representation, the wherein the three-dimensional representation is a point cloud.

In some aspects, the techniques described herein relate to a method, wherein the sensory information includes a of video information captured from a plurality of cameras.

In some aspects, the techniques described herein relate to a method, further including stitching the plurality of video information into a single video file.

In some aspects, the techniques described herein relate to a method, wherein the sensory information includes audio information captured from at least one microphone.

In some aspects, the techniques described herein relate to a method, further including providing audio information to an operator via at least one speaker.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 6B is a front perspective view of an exemplary controller for some embodiments;

FIG. 6C is a side perspective view of an exemplary controller for some embodiments;

Figure 1:
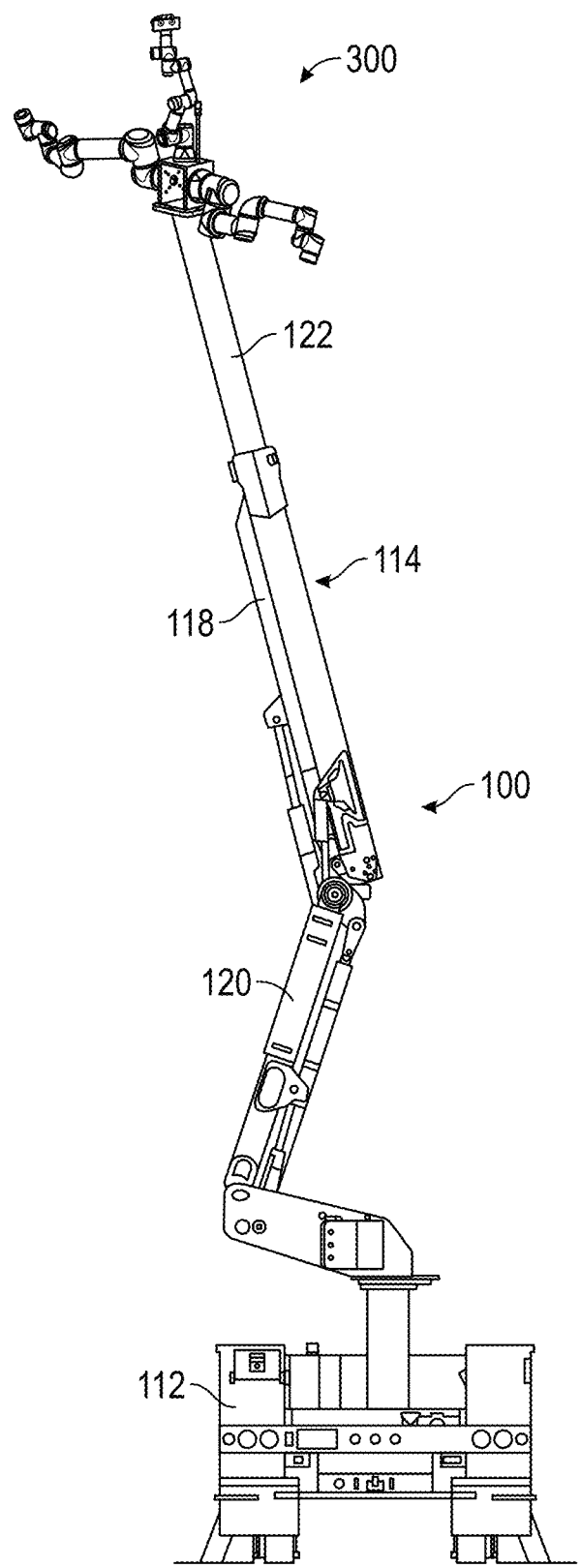
FIG. 1 is an aerial device for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

In some embodiments, a system for providing real-time, immersive, sensory information of a remote location is provided. Thus, such embodiments provide a solution to the above-mentioned problems by allowing the user to receive said sensory information. In some embodiments, the sensory information may be provided to the user based on a viewing parameter, such as a viewing angle of the user. The sensory information may be collected using a remote capture device installed in the remote location.

FIG. 1 depicts an aerial device 100 of some embodiments of the present disclosure. The aerial device 100 comprises a utility vehicle 112, a boom assembly 114, and a remote assembly system 300. The boom assembly 114 comprises a boom 118 having a boom proximal end 120 and a boom distal end 122. In some embodiments, the boom 118 is one of a telescoping boom 118 and an articulating boom 118. The boom assembly 114 may be attached to the utility vehicle 112 at the boom proximal end 120. The remote assembly system 300 may be secured to the boom distal end 122, such that the remote assembly system 300 is supported by the boom assembly 114. In some embodiments, and as described in greater detail below, the remote assembly system 300 may comprise at least a robot unit adapted for performing telecommunications repair, powerline repair, general repair work, or other actions that may be performed by a robot. For example, the robot unit may comprise one or more utility tools for performing actions such as sawing, cutting, screwing, wiring, or other actions associated with repair work. In some embodiments, the boom 118 is used to position the remote assembly system 300 in a remote location, such as, for example adjacent to an energized power line.

Broadly, aspects of the present disclosure are directed to a remotely controllable robot unit comprising an image and sensory capturing system and at least one utility arm for performing actions. As described herein, the robot unit may be controlled remotely by an operator to perform actions, such as powerline repair work. Through such remote control, the operator is removed from any potentially dangerous situations. To provide the operator with visual, sensory, and other information, the robot unit may further comprise a sensory capturing system comprising at least a camera and a three-dimensional depth camera. Video information may be provided to the operator through a virtual reality ("VR") headset and the operator may issue commands through joysticks or other controllers to instruct the robot unit to perform an action. To aid the operator and/or the robot unit in performing actions efficiently and correctly, three-dimensional depth information may be captured by the three-dimensional depth camera for generating a three-dimensional representation of the field of view at a computer. Accordingly, the computer can receive instructions, compare the instructions to the three-dimensional representation, and cause the robot unit to perform an action based on the instructions and the three-dimensional representation. To further aid in providing a realistic and immersive experience to the operator, the robot unit may comprise a six degree-of-freedom ("DOF") camera mount for mimicking or replicating the movement of the operator. Accordingly, in addition to movement in the x, y, and z plane, the robot unit can further control pitch, yaw, and roll of the camera mount, However, it will be appreciated that particular embodiments and applications of the present teachings may vary, including any of the examples provided herein. For example, the present disclosure may be utilized in a variety of applications, including but not limited to military applications, construction applications, rescue applications, health and safety applications or other applications that robotics may be utilized. Accordingly, it will be appreciated that specific embodiments or details provided herein are intended to be illustrative, rather than limiting.

Exemplary System Architecture

Figure 2:
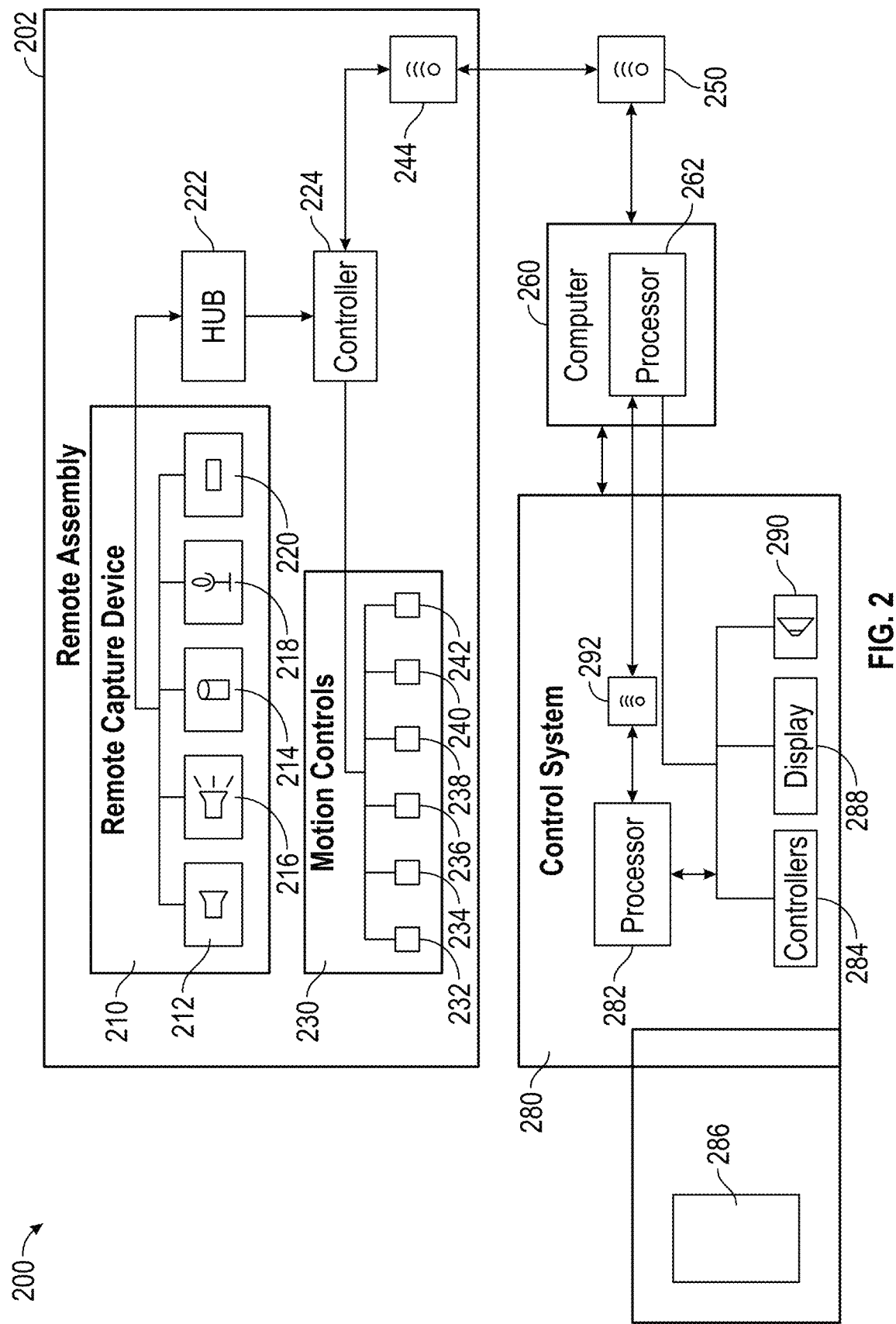
FIG. 2 is an exemplary system architecture of a robot unit and manual controls for some embodiments.

FIG. 2 depicts an exemplary block diagram 200 related to embodiments of the present disclosure. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 114 for interacting with a work site to perform one or more tasks. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial application. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 3K, 4K, or 8K resolution. However, it will be appreciated that the camera 212 may be any currently known or yet to be discovered camera for capturing video. Video captured from camera 212 may be stored locally at remote capture device 210 at a local memory 214. Local memory 214 may be any of the storage or memory described below with respect to FIG. 9. The storing of video at local memory 214 may aid in providing a failsafe or backup storage of captured video in the event of a transmission or upload failure. Further, the storing of video at local memory 214 may aid in situations of poor wireless connection or if a direct line becomes loose or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 114 for telecommunication or powerline work. In such a work application, remote assembly 202 may be working on or near live powerline or other conductive lines transferring electricity. Accordingly, in some embodiments, remote capture device 210 may comprise at least one sensor 220 configured as an electricity sensor for determining whether a cable or powerline has electricity running through it. However, it will be appreciated that remote capture device 210 may comprise additional sensors 220 configured and adapted for providing remote capture device and/or remote assembly 202 with additional information. By way of non-limiting example, sensor 220 may comprise any of the following sensors: a gyroscope, an accelerometer, a thermometer, a barometer, a light emitter, voltage detector, a weight-detection sensor, QR reader, magnetometers, pose sensor, rotary encoder, among other sensors that may be utilized in various applications of remote assembly 202.

For example, in some embodiments, at least one sensor 220 may be adapted and configured as a sensor for estimating the weight of an object. As described in greater detail below with respect to FIG. 3, in some embodiments of the present disclosure comprises a remote assembly comprising a robot unit to perform fine tuning or other dexterous actions and a heavy load bearing utility arm for holding and moving heavy loads. To aid an operator in determining whether the robot unit for fine tuning work can safely hold or manipulate an object, at least one sensor 220 may be a weight estimator. For example, the weight estimator may utilize point cloud weight estimation to estimate the weight of an object. The weight estimator may capture various images of an object for the generation of a point cloud based on the object. By way of non-limiting example, the weight estimator may capture an image of a powerline transformer. The generated point cloud image may determine the transformer comprises a diameter of 13.4" and a height of 15.8." Based on this information, a determination may be made that the transformer comprises a weight of 472.9 Lbs. This information may be presented to computer 260 or an operator in the manner described below, and the computer 260 and/or the operator may make a determination as to whether the robot unit or the heavy load bearing utility arm can safely hold and move an object.

Further, in some embodiments, at least one sensor 220 may be a quick response ("QR") reader for reading QR codes. For example, in some applications, remote assembly 202 may be applied in a scenario in which objects or assets may be applied with or comprise a QR code. Through utilization of a QR reader, information about the object or asset may be quickly ascertained and provided to computer 260 and/or an operator. Non-limiting examples of information that may be obtained through a QR reader may be the BIM specifications of an object, such as weight, size, lifting points, ratings, etc. It should be understood however, that any information about the object or asset may be ascertained through QR reading.

It should be understood that in some embodiments, remote assembly 202 may comprise a plurality of remote capture devices 210. Further, each of the remote capture devices 210 in the plurality of remote capture devices 210 may comprise varying components (I.e., camera 212, three-dimensional camera 216, sensor 220, etc.). Even further, each remote capture device 210 in the plurality of remote capture devices 210 may comprise uniform components. For example, as described above, remote capture device 210 may be used with a boom-mounted robot unit comprising a camera mount and at least one utility arm. A remote capture device 210 comprising camera 212, three-dimensional camera 216, and microphone 218 may be paired or positioned on the camera mount. Simultaneously, a second remote capture device 210 comprising a sensor 220 for detecting an electric voltage and a microphone 218 may be paired or incorporated into the utility arm.

In some embodiments, the remote assembly 202 further comprises at least one digital Hub 222. The digital Hub 222 may receive the captured sensory information from remote capture device 210 and convert the captured sensory information into a format suitable for transmitting to computer 260 and/or control system 280. In some embodiments, the digital Hub 222 is a USB Hub, such as, for example, a USB 3.0. In further embodiments, sensory information may be captured using Ethernet cameras or Ethernet coupled capture devices. Accordingly, in some embodiments, digital hub 222 may be replaced, substituted, or used in conjunction with an ethernet switch. It should be understood that sensory information may be captured in a variety of different formats. Accordingly, remote assembly 202 may utilize any hardware or software for receiving, analyzing, and/or transmitting sensory information.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions, or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244, or other transmitter, for communicating with computer 260 and/or control system 280 to send sensory information or other data or information to computer 260 and/or control system 280. Similarly, controller 224 may further be configured for receiving instructions, commands, or other information from computer 260 and/or control system 280. It should be understood that in further embodiments, controller 224 is not required to be directly coupled or incorporated into remote assembly 202. For example, remote assembly 202 may be incorporated into or be a component of a computer 260 and/or control system 280. Accordingly, in some embodiments, controller 224 may be incorporated into or directly paired with computer 260 and/or control system 280. In such embodiments, instructions, commands, or other communications may be sent from controller 224 to remote assembly 202. Remote assembly 202 may comprise computer hardware capable of receiving the transmitted instructions, commands, or communications from controller 224. For example, in some embodiments, it may be advantageous for controller 224 to be incorporated into a high-powered computing system that can transmit information to remote assembly 202.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as Wi-Fi, Bluetooth®, cellular connection, or another wireless connection. In embodiments in which computer 260 and remote assembly 202 are connected through a wireless connection, transceiver 244 may communicate with another transceiver 250 or transmitter coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210. In further embodiments, computer 260 may be in communication with one or more databases or data storages, as described in greater detail with respect to FIG. 9. For example, computer 260 may be in communication with a database comprising information directed to product or object information in a telecommunication or powerline setting. This may be particularly beneficial for obtaining information about particular objects or products that may be encountered in the application of various embodiments of the present disclosure. For example, described above, remote assembly 202 may comprise a weight estimator utilizing a point cloud for estimating weight of an object. Computer 260 may utilize the data obtained by weight estimator in making an estimation about the weight of the object. In further embodiments and as described above, remote assembly 202 may comprise a QR reader for identifying assets or objects. Once a QR code is scanned, computer 260 may access the storage or database to identify information about the asset or object.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, telecommunications repair or powerline repair sometimes occur during or immediately after a severe weather storm. This type of scenario can be wrought with dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. Exemplary embodiments of controller 284 are provided below with respect to FIGS. 6B-6C, however, it will be appreciated that the depicted embodiments are intended to be illustrative, rather than limiting. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumb sticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In further embodiments, operator inputs may further be captured through AC electromagnetic tracking. In even further embodiments, operator inputs may further be captured through an active force feedback imitative control. In even further embodiments, operator inputs may be further captured through a passive force feedback imitative control. It will be appreciated that the examples provided herein are intended to be illustrative, rather than limiting, and that controller 284 may be any apparatus or method of receiving instructions or an input from an operator or computer for autonomous control.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts, or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIG. 9 below. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator is physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly 202. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an inclinometer, an accelerometer, a gyroscope, a light sensor, magnetometers, pose sensors, rotary encoder, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Exemplary Hardware

Figure 3:
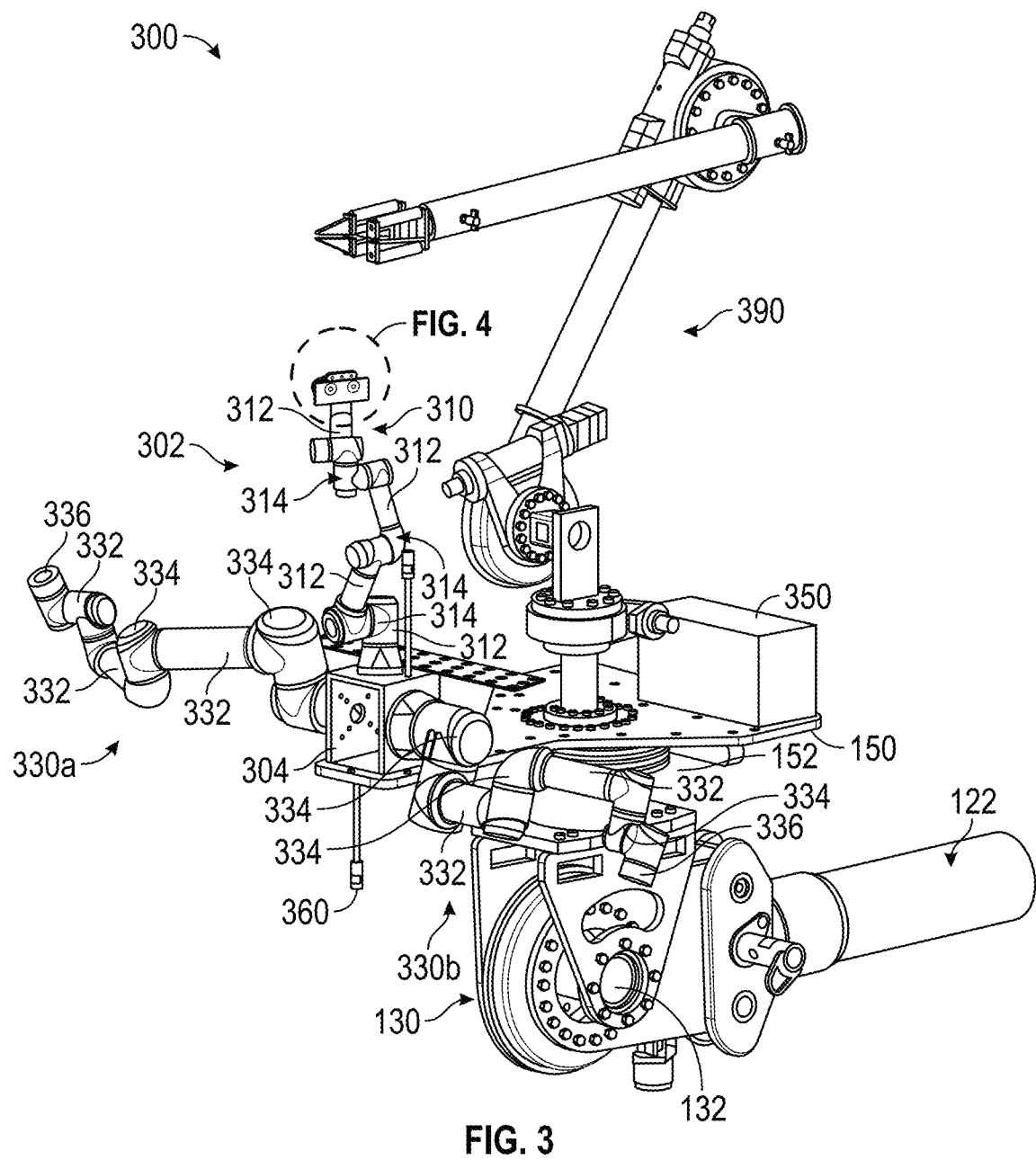
FIG. 3 is a remote assembly system for some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 114. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be a fully automated robot, wherein the robot unit 302 performs actions or movements based on pre-programmed instructions for automation. In even further embodiments, robot unit 302 may be a robot configured to respond to both manually inputted instructions and automated programming. The various movements or actions performed by robot unit 302 and described herein may be performed based on manually provided instructions and/or automated programming. Accordingly, embodiments of the present technology are anticipated to support fully autonomous control, fully manual control, or a hybrid (semi-autonomous) control wherein the operator is interacting with and providing manually provided inputs along with automated inputs to control remote assembly system 300.

As described above and as illustrated in FIG. 3, in some embodiments, remote assembly system 300 may be positioned at the distal end 122 of boom assembly 114. As used herein, remote assembly system 300 and system 300 may be used interchangeably. As depicted, in some embodiments, distal end 122 of boom assembly 114 may comprise a pivot joint 130 comprising a motor 132. In some embodiments, pivot joint 130 may be used to change an angle or position of remote assembly system 300. In further embodiments, pivot joint 130 may be paired with a sensor, such as an inclinometer paired with a rotary encoder for closed-loop feedback, to aid in maintaining a leveled position of remote assembly system 300. However, pivot joint 130 may comprise any sensor, including but not limited to magnetometers, pose sensors, rotary encoders, among other sensors. As further depicted in FIG. 3, pivot joint 130 may further act as an attachment point between remote assembly system 300 and boom assembly 114. For example, base 150 may be coupled to pivot joint 130. Base 150 may be adapted and configured for receiving and coupling remote assembly system 300. Accordingly, through such coupling, remote assembly system 300 may be secured and attached to boom assembly 114. In some embodiments, base 150 may comprise a generally planar design for accepting and securing one or more assemblies, sub-assemblies, parts, or components of remote assembly system 300. Further, the size and shape of base 150 may vary, and may be dependent on the design of remote assembly system 300. Further, in some embodiments, base 150 may further comprise a motorized turntable 152. Motorized turntable 152 may be a power motor train system for rotating base 150. The rotation of base 150 may be advantageous for positioning remote assembly system 300 during use. In some embodiments, the various assemblies, sub-assemblies, parts, and/or components of system 300 may be adapted and configured to be selectively and removably attached to boom assembly 114. For example, utility vehicle 112 may be driven to a job location with a bare boom assembly 114, with the various assemblies, sub-assemblies, parts, and/or components of system 300 stored in or on utility vehicle 112. Once at the job site, system 300 may be assembled for use. This may be advantageous for protecting aspects of system 300 during transit.

In some embodiments, remote assembly system 300 may generally comprise a robot unit 302. Robot unit 302 may be a controllable robotics unit that can perform a range of movements and actions, such as performing repair work in a telecommunication setting. In some embodiments, and as described in greater detail below, robot unit 302 may be a 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base 150. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one remotely controlled movable camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be communicated to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit 302. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device. The sensory capture device is described in greater detail below with respect to FIG. 4, but generally comprises at least one camera, a three-dimensional camera, and/or sensor for capturing sensory information.

As described above, robot unit 302 may be adapted for performing repair work, maintenance work, or other similar situation, tasks, or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separated by motorized pivotable joints 334. The number and size of utility mount segments 332 and pivotable joints 334 may vary depending on the embodiments and application of robot unit 302. Generally, in response to an instruction or commands, one or more of the pivotable joints 334 may activate to rotate or move utility arms 330a, 330b. In some embodiments, the pivotable joints 334 may be used to move utility arms 330a, 330b in the X-axis, Y-axis, Z-axis as well as control the roll, pitch, and yaw of the utility arm 330a, 330b. Accordingly, through movement in the 6 DOF, each utility arm 330a, 330b may mimic or replicate the movement of an operator's arms and hands. In some embodiments, the distal ends 336 of utility arms 330a, 330b may comprise one or more tools, flanges, or other apparatus for performing an action such as repair work. In some embodiments, distal ends 336 may comprise an adapter or may be otherwise configured for accepting a tool.

In some embodiments, specialized tools may be used to couple to manipulators located at a distal end of each of utility arms 330a, 330b and to provide simple use for high-dexterity manipulators of robot unit 302 and high-capacity manipulator manually controlled or controlled by control algorithms. For example, an insulator may be adapted to provide a long rod portion for ease of gripping by a high-dexterity clamp. Furthermore, the insulator may be fashioned with ring bolts such that robot unit 302 may utilize a high-dexterity clamp for grabbing and rotating. Various hot-stick tools may be adapted to couple to the manipulators to provide ease of use. Hot-stick ring tools may be provided in various sizes to be used in tie-wire wrapping and unwrapping and hot line hooks may be used to simplify snagging a cable. Similar to high-dexterity clamp, a 4-bar linkage gripper may be adapted or configured to be coupled to manipulators providing high-capacity gripping. Further, a phase cutter (not shown) may be modified to couple to high-dexterity manipulators and/or high-capacity manipulators. Furthermore, a clamp, tool adapter, and manipulator adapter may be used to couple specialized tools to the manipulators and to various tool holders when the specialized tools are not in use.

Additionally, in some embodiments, system 300 may utilize and/or comprise an automated tool changer system. For example, the automated tool changer system may comprise a tool changer carousel and changer adapters attached to high-dexterity manipulators. Tool changer carousel may provide a plurality of specialized tools for immediate use. In some embodiments, an operator may select a tool by manipulating hand controllers 650a, 650b (as described in greater detail below) and tool changer carousel may rotate to provide the selected tool. In some embodiments, robot unit 302 may finish a first job and need a different tool for a second job. As such, a stored database of the tool locations may be accessed by computer-executable instructions to select the appropriate location for the tool, and tool changer carousel may be actuated to the appropriate tool for the second job. In some embodiments, the tools may comprise near-field communication devices such as, for example, radio frequency identification, BLUETOOTH®, and the like. As tool changer carousel is attached to high-dexterity manipulators, the various tools may be attached prior to performing work based on the jobs to be performed. As such, an operator may attach the tools, or the tool attachment may provide the various tools to simply rotate the tools when few tools are needed to finish a job.

For example, an exemplary independent tool holder carousal may comprise a clamp and adapters. Tool holder carousel may be positioned on a carousel platform, which, in some embodiments, may be base 150 or may be mounted on base 150, or at any other location within reach of robot unit 302. The location of each tool may be stored in a database accessible by controller 224 as described above such that when a new tool is needed, the tool holder carousel may rotate to a position presenting the new tool to robot unit 302. Robot unit 302 may simply slide manipulator adapter through clamp coupling to tool adapter coupling new tool to high-dexterity manipulators. Similarly, robot unit 302 may move high-dexterity manipulators across an empty clamp in the opposite direction to release a tool into the clamp on tool holder carousel. In some embodiments, other manipulators and tool adapters may be used. For example, pneumatically driven pins, twist lock/cams, spring-loaded pins, or any other type of automatic locking mechanism that may be used to lock a tool onto high-dexterity manipulators.

Remote assembly system 300 may further comprise a remote power source 350. In some embodiments, the remote power source 350 may be secured to the base 150. In further embodiments, remote power source 350 may be located within central hub 304. The remote power source 350 may be used to power camera mount 310, utility arm 330a, utility arm 330b, arm 390 or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator in addition to the sensors or capture devices of sensory capture device 410 as described below. For example, in some embodiments, robot unit 302 may comprise a thermometer or heat sensor for capturing heat information. In some embodiments, remote assembly system 300 may comprise an electrical sensor for capturing electrical data. For example, remote assembly system 300 may be used to work on power lines or in other scenarios involving live power lines or other electrically charged wires or circuitry. Accordingly, to avoid damage to the robot unit 302, the boom assembly 114, or the utility vehicle 112, at least one sensor 360 may be a sensor for detecting an electrical current. Additionally, robot unit 302 may comprise at least one sensor 360 that is at least one of an accelerometer, gyroscope, light sensor, inclinometer, magnetometer, pose sensor, rotary encoder, or other sensors for detecting the positioning of camera mount 310, utility arm 330a, and/or utility arm 330b. As described in greater detail below, a sensor for detecting the positioning of robot unit 302 may aid in replicating or mimicking movement of an operator using motion controls.

In some embodiments, and as depicted in FIG. 3, in addition to robot unit 302 and remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require robotics configured for transporting heavy loads. However, once in position, the part may need robotics configured for delicate or sophisticated operations to install the part in position. Embodiments of the present disclosure solve this dilemma by pairing a robotics configured and adapted for fine tuning and/or delicate work with a robotics configured and adapted for load bearing or transporting heavy loads. For example, in some embodiments, robot unit 302 may be configured and adapted for performing movements or actions directed to sophisticated, delicate, or fine-tuning work, such as unthreading wire, cutting wire, loosening screws and bolts. In some embodiments, system 300 may comprise at least one utility arm 390 for holding or transporting heavy loads that may be too heavy for robot unit 302 to safely hold and transport. Accordingly, through the combination of robot unit 302 and utility arm 390, remote assembly system 300 may perform both dexterous actions and load-bearing actions.

Figure 4:
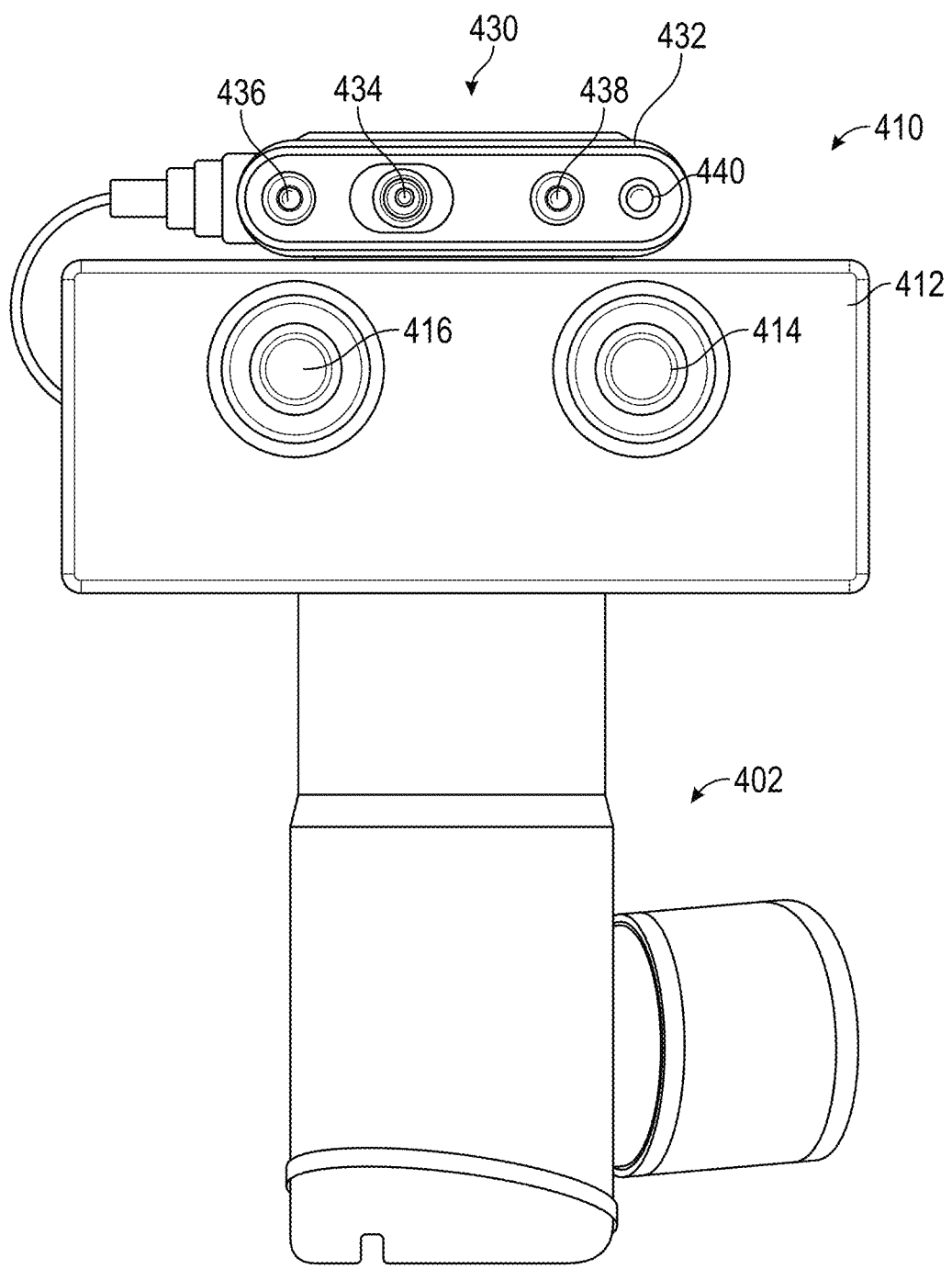
FIG. 4 is a sensory information capture unit for some embodiments.

FIG. 4 is a close-up view of the camera mount 402 and sensory capture device 410 of robot unit 302 as depicted in FIG. 3. As described above and in some embodiments robot unit 302 may comprise at least one camera, at least one three-dimensional camera, at least one sensor, or any combination thereof for the capturing of sensory information. FIG. 4 depicts an exemplary sensory capture device 410 for the capturing of video information, three-dimensional depth information, audio information, sensor information, and/or other sensory information, or any combination thereof. Sensory capture device 410 may be the same as remote capture device 210 as described above with respect to FIG. 2. In some embodiments, sensory capture device 410 may be affixed or coupled to the top of a remotely controlled movable camera mount, which may be camera mount 402 as described above with respect to FIG. 3. As further depicted in FIG. 4, a sensory capture device 410 may be disposed on, or incorporated into camera mount 402. As depicted, in some embodiments, sensory capture device 410 may comprise a mount housing 412 for housing one or more cameras, sensors, microphones, batteries, power sources, or other parts or components of sensory capture device. For example, to mimic or replicate an operator's anatomy, mount housing 412 two cameras, camera 414 and camera 416. In some embodiments, each of camera 414 and 416 may be camera 212 as described above with respect to FIG. 2. It should be understood that the illustrated embodiment of sensory capture device 410 depicts two cameras, sensory capture device 410 may comprise a single camera or more than two cameras. In some embodiments, each of camera 414 and 416 may be adapted and configured for capturing high-definition (HD) video. For example, in some embodiments, each of camera 414 and 416 may be HD cameras configured to capture video in 720p, 1080p, 2K, 4K, or any other resolution. Additionally, in some embodiments, each of camera 414 and 416 may further be adapted and configured to capture video in HD and in low light at a minimum lux of at least 0.0687 lux. Each of camera 414, 416 may further comprise a lens adapted for capturing a viewing area, which may vary depending on the application of robot unit 302. For example, in some embodiments, cameras 414, 416 may comprise macro lenses, telephoto lenses, wide angle lenses, standard lenses, or specialty lenses such as fisheye lenses or infrared lenses.

As further depicted, sensory capture device 410 may further comprise at least one three-dimensional camera 430 for capturing three-dimensional information. In some embodiments, three-dimensional camera 430 may be the three-dimensional camera 430 as described above with respect to FIG. 2. In some embodiments, three-dimensional camera 430 may be coupled to or incorporated into mount housing 412. Accordingly, three-dimensional camera 430 may be adapted to move in relation to mount housing 412 and by extension, each of camera 414, 416. This may be particularly advantageous to aid in aligning the field of view of cameras 414, 416 with the field of view of three-dimensional camera 430. As described in greater detail below, three-dimensional camera 430 may capture three-dimensional information or data about an area or object. Aligning the views of camera 414, 416 with three-dimensional camera 430 may aid the computer 260 when generating a three-dimensional representation and/or when comparing movement instructions for the robot unit 302.

Three-dimensional camera 430 may be any known camera or device for the capturing of three-dimensional depth information. For example, three-dimensional camera 430 may utilize any of structured light and coded light, stereo depth, time of flight and LIDAR, a combination of these techniques, or any other techniques for capturing three-dimensional depth information. In some embodiments, three-dimensional camera 430 may comprise a three-dimensional camera housing 432 which may be coupled to mount housing 412. Further, three-dimensional camera housing 432 may further house one or more parts or components of three-dimensional camera 430. For example, three-dimensional camera housing 432 may comprise at least a light source 434, a first lens 436, a second lens 438 and/or a sensor 440. By way of non-limiting example, light source 434 may be an IR light source for emitting a wavelength of IR light towards an object. The reflected light from the object may be captured by first lens 436 and second lens 438 for measuring the depth of the object. In some embodiments, sensor 440 may be an RGB-D sensor, which may aid in mapping three-dimensional depth information on a pixel-by-pixel basis.

In further embodiments, three-dimensional depth information may be captured by cameras 414, 416 in place of or in conjunction with three-dimensional camera 430. For example, cameras 414, 416 may be adapted and configured for capturing stereo depth, allowing camera 414, 416 to capture three-dimensional depth information in addition to or in place of video sensory information.

It should be understood that the examples provided herein are intended to be illustrative rather than limiting, and system 300 may utilize any three-dimensional capturing device or technique for capturing three-dimensional depth information.

Exemplary Capture and Three-Dimensional Representation

Figure 5A:
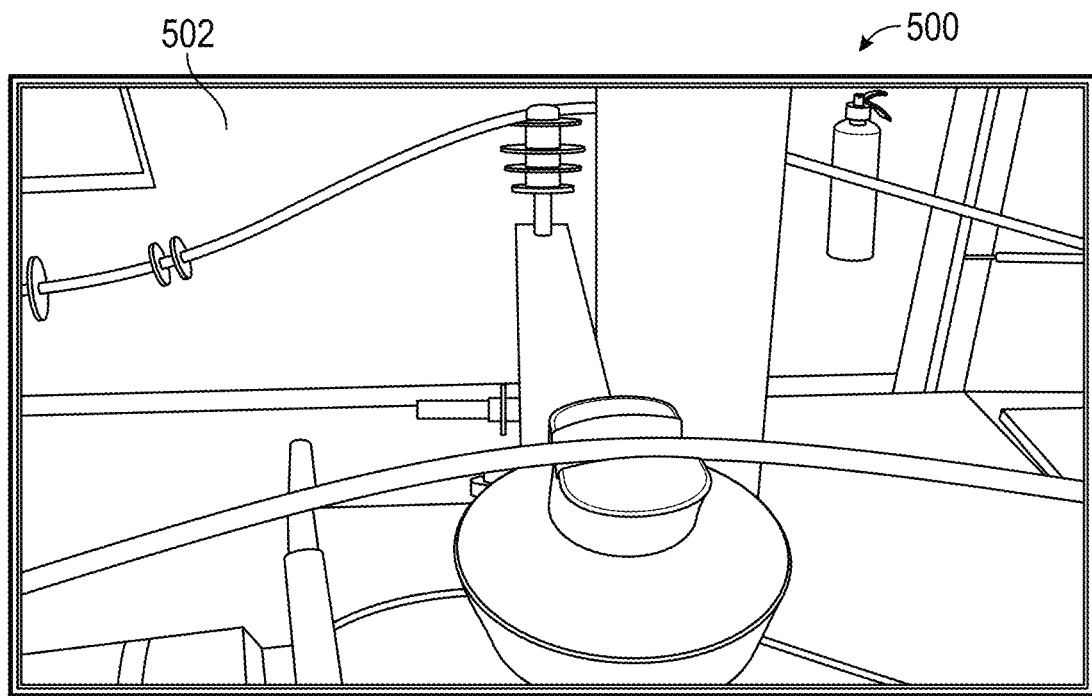
FIG. 5A is a heads-up-display with captured video for some embodiments.

FIG. 5A is an exemplary video capture 500 that may be presented to an operator. In some embodiments, video capture 500 may be video information captured by the one or more cameras 212 of remote capture device 210 as described above. The video capture 500 may comprise video of a select field of view captured by one or more of the cameras 212. For example, in some embodiments, robot unit 302 may comprise multiple remote capture devices 210 and/or multiple cameras 212 positioned at various points on or around robot unit 302 to provide for a plurality of field of views. In some embodiments, the plurality of cameras may be positioned to capture a field of view from a single point and capture a field of view generally corresponding to the range of a human, or from about 200 degrees to about 220 degrees. In further embodiments, the plurality of cameras may be positioned to capture a field of view greater than the field of view range of a human, and the captured video may be stitched together to provide an operator with a greater perspective of view. In further embodiments, only a portion of the captured video may be transmitted for display on display 288. For example, robot unit 302 may comprise a plurality of cameras 212 capturing video from a field of view greater than the field of view of a human but display only a portion of the captured video may be provided to the operator via display 288.

Figure 5B:
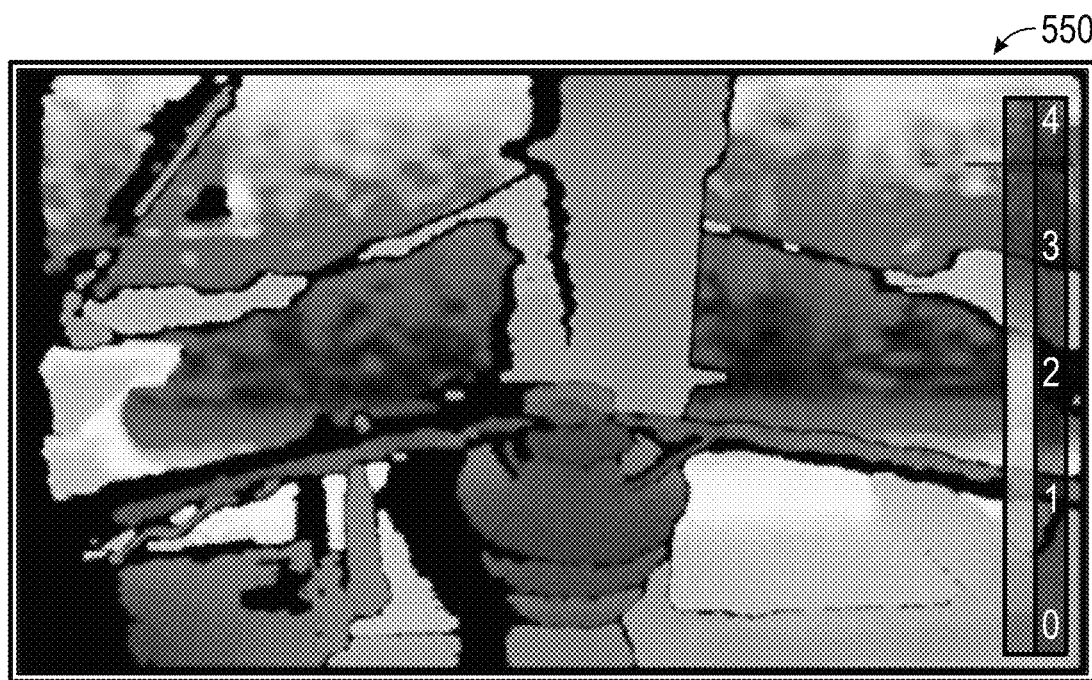
FIG. 5B is a (three-dimensional imaging) of the captured video for some embodiments.

Turning now to FIG. 5B, an exemplary three-dimensional representation 550 is depicted. In some embodiments, captured sensory information may be transmitted to computer 260 for processing, analyzing, or other interpretation and/or manipulation. As described above, a portion of the captured sensory information may be transmitted from computer 260 to an operator via the display 288 of control system 280. However, in some embodiments, computer 260 may utilize at least a portion of the captured sensory information for translation purposes, stitching purposes, or other processes. One exemplary way that computer 260 may utilize the captured sensory information is to generate a three-dimensional representation. In some embodiments, the three-dimensional representation may be a 3-D model, a point cloud, or other digital representation. an exemplary three-dimensional representation 550 is depicted in FIG.

As depicted and in some embodiments, the three-dimensional representation may be a digitally generated model based at least in part on the captured sensory information. For example, computer 260 may utilize captured three-dimensional depth information to generate the three-dimensional representation. In some embodiments, computer-executable instructions at computer 260 may process the captured three-dimensional depth information using the intrinsic properties of the lenses of three-dimensional camera 430 and/or cameras 414, 416. Using these intrinsic properties, computer 260 may map from a pixel coordinate to an angle of incidence from the imaging sensor. Additionally, the combining of the angle of incidence with the captured three-dimensional depth information, the coordinate of the point in space can be determined. Through the generation of a three-dimensional representation, computer 260 may better ascertain the shape, depth, and/or positioning of an object within the field of view of system 300. This may be particularly advantageous in mapping movement instructions from an operator and positioning utility arms 330a, 330b and/or camera mount 310.

Figure 6A:
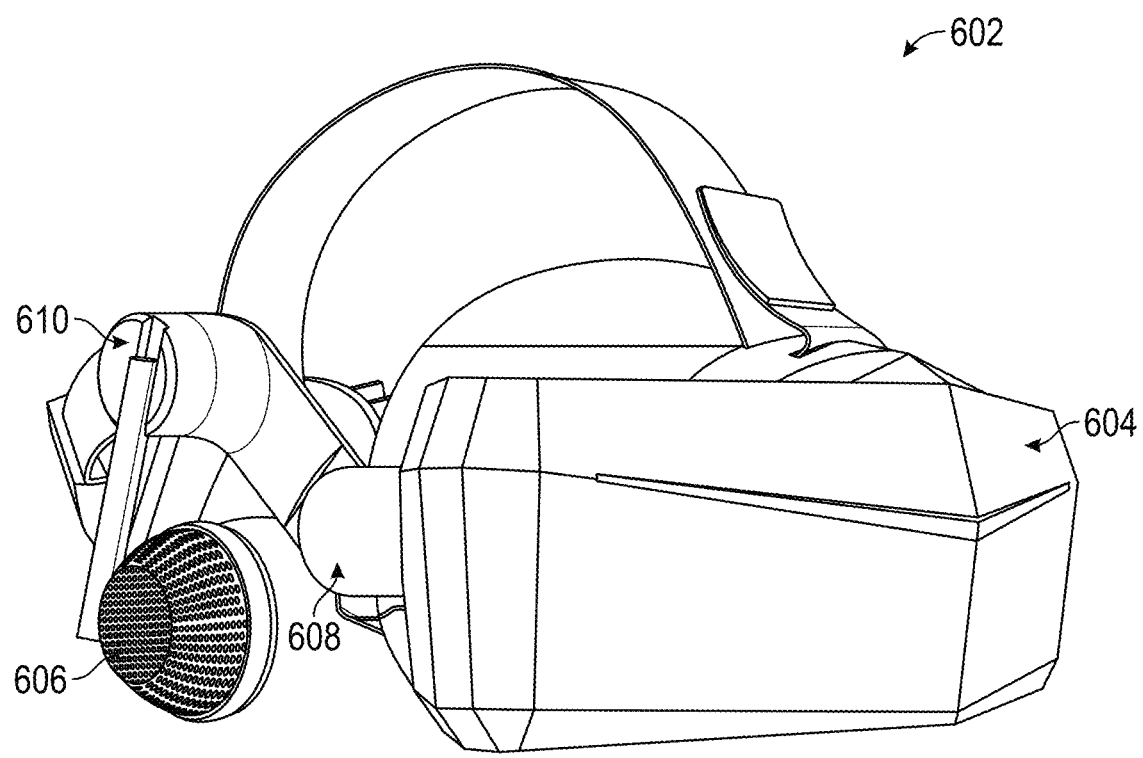
FIG. 6A is a front perspective view of an exemplary head mount for some embodiments.

FIG. 6A depicts an exemplary head mount 602 for providing captured video to an operator. In some embodiments, head mount 602 may be adapted and configured to be worn by an operator on the operator's head. In some embodiments, head mount 602 may comprise at least the display 288 and/or sensor 290 of control system 280 as described above with respect to FIG. 2. Accordingly, in some embodiments, head mount 602 may comprise at least one visual display 604 for displaying at least a portion of the captured sensory information to the operator. In some embodiments, the visual display 604 may be a liquid crystal display (LCD), a light-emitting diode (LED) display, or any other suitable display device to be located in front of the operator's eyes like goggles, eyeglasses, VR gaming headset, or other similar head-mounted display. In some embodiments, the visual display 604 may be communicatively coupled to a processor, including for example processor 282 of control system 280 as described above. Accordingly, visual display 604 may process and/or receive a signal for displaying sensory information on visual display 604. In some embodiments, processor 282 may be disposed within head mount 602. In further embodiments, processor 282 may be disposed on the remote assembly, on the utility vehicle 112, or disposed in computer 260. In some embodiments, a plurality of processing elements or processors may be used. It should be understood that processor 282 as described herein may refer to any of the single processing element and a plurality of processing elements described below with respect to FIG. 9. Additionally, the plurality of processing elements may be distributed across various locations. For example, in some embodiments, a first processing element may be disposed on the remote assembly 202, a second processing element may be disposed in the computer 260, and a third processing element may be disposed within the head mount 602.

In some embodiments, at least a portion of the captured sensory information may be transmitted for display on display 604. For example, the captured video may be displayed and provided in a similar manner to the captured image 502 as depicted in FIG. 5A. The characteristics of the displayed sensory information may vary and may be dependent on factors such as the resolution of the display 604, the resolution of remote capture device 210, the available network connection for transmitting sensory information as a signal, among other factors. For example, in some embodiments, the sensory information displayed on display 604 may be a video at a 1080p resolution. However, in further embodiments, the resolution of the captured video may be greater than or less than 1080P resolution, including for example 2K resolution. Additionally, in some embodiments, a heads-up display (HUD) may be generated and displayed to the operator by superimposing one or more graphical aspects of the HUD on display 604. The HUD may be a digital and visual representation of additional information that may be superimposed on video or other sensory information displayed on display 604. For example, the HUD may include a visual representation of machine diagnostic information relating to one or more of the utility arms 330a, 330b, the remote capture device 210, the remote assembly 202, the utility vehicle 112, and/or the boom 118, among other parts, components, or sub-assemblies of the overall system. It should also be understood that the HUD, in some embodiments, includes a visual representation of a timer, a clock, a measured voltage at the boom tip, and/or a warning indication. In further embodiments, HUD may further comprise a visual representation directed to the manual operation of remote assembly 202, boom 118, arm 390, and/or utility vehicle 112. For example, as described in greater detail below, control system 280 may be adapted and configured for providing instructions or commands to one or more assemblies, including for example, robot unit 302 and arm 390. To provide a single operator to control each of robot unit 302 and arm 390 with a single controller 284, an operator may selectively switch control between robot unit 302 and arm 390. For example, the operator may toggle a switch or other input on controller 284 to selectively switch control from robot unit 302 to arm 390, such as for positioning a heavy part using arm 390 to then install with robot unit 302. Rather than using multiple controllers 284, the operator may use a single controller 284 and selectively switch between different assemblies, sub-assemblies, parts, or components of system 300 the operator is controlling. Accordingly, a single operator may operate multiple assemblies or sub-assemblies, eliminating the need for multiple operators controlling individual assemblies or sub-assemblies. HUD may provide a visual indication to the operator, identifying which assembly or sub-assembly the operator is currently controlling or providing instructions to. Additionally, the visual representations may vary and may be generated based on which assembly or sub-assembly the operator is currently operating. For example, when controlling arm 390, information directed to the weight load may be generated and displayed via HUD. When controlling robot unit 302, voltage information may be generated and displayed via HUD.

In some embodiments, head mount 602 may further comprise at least one speaker 606 to provide audio or sounds to the operator. In some embodiments, head mount 602 may comprise two speakers 606 generally corresponding to each ear of the operator to provide an immersive experience and/or for providing sound in an efficient or effective manner. For example, the sensory information captured by remote capture device 210 may include audio information. Similar to transmitting captured video for displaying on display 604, captured sound or audio captured from remote capture device 210 may be transmitted to head mount 602 and played over the at least one speaker 606. For example, captured audio information may aid an operator during operation of robot unit 302, such as knowing when a power line has been successfully cut or any other operation that would benefit from audio information. Additionally, other sounds may be played through speaker 606 in addition to in, or in place of captured audio information. For example, audio sounds may include alarms, warnings, or other notifications indicative of an operating condition of robot unit 302, arm 390, boom assembly 114, or any other part, component, assembly, or sub-assembly of the system. By way of non-limiting example, an alarm may be played over the speaker 606 to indicate an inadvertent loss of electrical bonding between robot unit 302 and an energized power line. In such an example, the electrical bonding may be measured by at least one sensor 290 disposed in or on robot unit 302. In some embodiments, captured audio sensory information about a job site may be useful to an operator. By way of non-limiting example, an operator working on a live powerline may listen for visual cues or indicators, such as a crackling noise coming from the powerline. A crackling noise may be indicative of a high-voltage arcing indicating a safety concern. By way of another non-limiting example, the sound of splintering wood may be indicative that a tree branch is falling or other safety concern such as a powerline cracking. Accordingly, sound feedback from recorded audio sensory information may provide indications or prompts to an operator to inspect the operator's surroundings for safety hazards. In some embodiments, pre-recorded or pre-rendered audio may also be provided to an operator through speaker 606. For example, instructions for performing diagnostic testing, repair work, or other actions may be pre-recorded to provide an operator with aid or instructions when performing an action. The instructions may be provided to the operator through speaker 606 during operation of remote assembly system 300, aiding the operator in performing an action such as a repair.

In some embodiments, head mount 602 may further comprise at least one sensor 608. In some embodiments, the at least one sensor 608 may be any of the sensors 290 described above with respect to FIG. 2. For example, as described herein, robot unit 302 may comprise at least one utility arm 330a, 330b or camera mount 310 that may move or change a field of vision in response to an instruction or command from an operator. In some embodiments, the instruction or command from an operator may be inputted through movement of head mount 602. For example, to provide an immersive experience, an operator may move his or her head while wearing head mount 602. Accordingly, the one or more sensors 608 may be one of an accelerometer, an inclinometer, a gyroscope, a light sensor, a magnetometer, a pose sensor, a rotary encoder, or any other type of sensor suitable to detect the movement and/or viewing angle of head mount 602. Similarly, sensor 608 may be operable to detect the viewing position of the operator. In further embodiments, additional techniques or methods may be employed for detecting the movement and/or positioning of the operator's head, including but not limited to AC electromagnetic and video capture, among other techniques. In some embodiments, it may be preferable that the sensor 608 detects a change in the viewing angle or change in the viewing position of the user. In some embodiments, a plurality of different types of sensors in various locations may be used to include redundancy or to increase accuracy. For example, an accelerometer may be used to detect an acceleration signal, the acceleration signal may be integrated to yield a velocity signal which may then be compared to a velocity signal detected by a gyroscope, wherein each of the accelerometer and the gyroscope use a light sensor as a reference. In some embodiments, any of the sensors described herein may be included in both the head mount 602 and on robot unit 302 and/or arm 390. Sensors on robot unit 302 may be used to collect sensory information or as part of the control process to adjust the remote capture device 210 in order to match the viewing parameter, angle, movement, or positioning of the operator. For example, a first sensor may be placed on the head mount 602 to sense the movement, positioning, and/or viewing angle of the head mount 602 and a second sensor may be placed on the remote capture device 210 to sense movement, positioning, and/or viewing angle of the remote capture device 210. The readings of the first sensor and the second sensor may be compared and used by the computer 260. In some embodiments, the computer 260 may use the data from the second sensor as a feedback signal to control movement of the remote capture device 210.

Head mount 602 may further comprise a transceiver 610 configured for transmitting sensor data, including movement information captured by an accelerometer disposed within head mount 602. The transceiver 610 may be the same transceiver 292 as described above with respect to FIG. 2. Transceiver 610 may be in communication with the transceiver 250 associated with computer 260 for transmitting the captured sensor data corresponding to the movement of head mount 602 and/or the viewing parameter of the operator. Computer 260 may compare the received sensor data from head mount 602 with the generated three-dimensional representation to determine a movement of the camera mount based on both the received sensor data and the three-dimensional representation. The computer 260 may then send instructions or commands to robot unit 302 to rotate or move camera mount 310 based on the viewing angle, positioning, and/or movement of the user. The camera mount 310 may be rotated such that the angle of the first camera 414 and the second camera 416 correspond to the viewing angle, positioning, and/or movement of the user. Accordingly, visual display 604 shows a visual representation of the remote location that the operator would perceive if the operator were in the remote location with a similar viewing angle of robot unit 302. As described above, in some embodiments camera mount 310 may comprise a 6 DOF mount. Accordingly, in addition to the viewing angle captured by the angle or positioning of the operator's head, additional positioning and movement of the operator may be more accurately performed by camera mount 310. For example, by moving in 6 DOF, camera mount 310 may better mimic or replicate torso movements, directional movement, and general movement of the operator.

In some embodiments, it may be desirable to increase the sampling rate of the sensor 608 on the head mount 602, such that the viewing angle is updated so that the direction of the camera mount 310 consistently matches the viewing angle of the operator. The sampling rate, in some embodiments, for example, may be selected from the following sampling frequencies: 60 Hz, 100 Hz, 1,000 Hz, and 10,000 Hz. In some embodiments, the sampling rate may be another sampling frequency. Thus, a lag is reduced. Lag as described herein, refers to the time between when the viewing angle of the user is changed and when the change is implemented by the camera mount 310 to move the cameras. Further, methods of reducing lag for some embodiments involve optimizing processing such that the least amount of processing is carried out in order to perform the necessary functions of the present disclosure according to each particular embodiment. Additional forms of lag may include the time between when the sensory information is collected by the remote capture device 210 and when the sensory information is shared with the user via the head mount 602. It should be understood that said additional forms of lag may also be reduced using any lag reduction method described herein or any other known lag reduction method, such as, for example, processing optimization, optimizing sampling rate, and fiber-optic transmission.

FIGS. 6B-6C depicts exemplary controllers 650a, 650b for providing commands or instructions to the robot unit. Each of controllers 650a, 650b may correspond to controllers 284 as described above with respect to FIG. 2. Accordingly, controllers 650a, 650b are not limited to the illustrated embodiment, and may be any of the controllers described above with respect to FIG. 2. As depicted above and in some embodiments, robot unit 302 may comprise two utility arms 330a, 330b for performing actions. Accordingly, to mimic native operator movements, an operator may utilize two controllers, including for example controllers 650a, 650b. However, it should be understood that the number of controllers is not limited to directly corresponding to the number of utility arms. For example, a single controller may be utilized, and an operator may switch control between multiple utility portions of system 300.

As depicted and in some embodiments, controllers 650a, 650b may be adapted and configured as handheld or hand-graspable controllers. Accordingly, controllers 650a, 650b may comprise a design adapted and configured for placement in the hand of an operator. In some embodiments, each of controllers 650a, 650b may be handheld controllers for controlling at least one utility arm 330a, 330b, camera mount 310, arm 390, or any other assembly, sub-assembly, part, or component of system 300. In some embodiments, controllers 650a, 650b may comprise a selection input 652 in the form of a button, switch, or other selectable input for switching control between the various assemblies, sub-assemblies, parts, or components of system 300. For example, controllers 650a, 650b may comprise a selectable button to toggle control between robot unit 302, arm 390, and boom assembly 114. Accordingly, a single operator may position system 300 by controlling boom assembly 114, and when the system 300 is in position, toggle control to robot unit 302 or arm 390 to perform an action. As described above, HUD may display to the operator which assembly, sub-assembly, part, or component the operator is currently controlling, which may be responsive to the operator providing an input via input 652. Controllers 650a, 650b may comprise at least one additional input, including for example a control input 654. In some embodiments, control input 654 may be used to provide instructions or commands to system 300. By way of non-limiting example, control input 654 may be selected by the operator to send an instruction to robot unit 302 to begin recording video, collect three-dimensional information, or sensory information. In further embodiments, controllers 650a, 650b may further comprise a directional input 656. Direction input 656 may be a directional pad, joystick, or trackpad as depicted in the illustrated embodiment, direction input 656 may be used to control the directional movement of a utility arm 330a, 330b, camera mount 310, arm 390, boom assembly 114, and/or any other assembly, sub-assembly, part, or component of system 300. As described in greater detail below, controllers 650a, 650b may comprise one or more sensors for capturing directional movement which may be transmitted to cause movement of robot unit 302. In some embodiments, movement of robot unit 302 may be selectively toggled to be caused by only captured motion of controllers 650a, 650b, only by inputs provided by directional input 656, or a combination of both. For example, as described above, utility arm 330a, 330b may be adapted and configured to comprise a plurality of utility tools. Movement data captured by a sensor in controller 650a, 650b may be used to position utility arm 330a, 330b near an object and directional input 656 may be used to instruct movement of the utility tool. Accordingly, embodiments of the present disclosure provide an operator with flexibility and variety in determining how best to instruct remote assembly system 300 to perform a movement or action. In some embodiments, controllers 650a, 650b may further comprise at least one trigger input 660. In some embodiments, trigger input 660 may be a pressure sensitive trigger button that an operator may apply a selective pressure to. In some embodiments, an input comprising a trigger-like design may be advantageous when a selective application of force is required.

In some embodiments, each of controllers 650a, 650b may comprise at least one sensor 662 for detecting a position or a movement of controller 650a, 650b. For example, the at least one sensor 662 may be any of the sensors 290 described above with respect to FIG. 2. For example, as described herein, robot unit 302 may comprise at least one utility arm 330a, 330b that may move or perform an action in response to an instruction or command from an operator. In some embodiments, the instruction or command from the operator may be inputted through physical movement of controllers 650a, 650b. For example, similar to head mount 602, an immersive experience may be provided to the operator by instructing robot unit 302 to move in response to movement of the operator holding controllers 650a, 650b. Accordingly, like head mount 602, the at least one sensor 662 may be one of an accelerometer, a gyroscope, a light sensor, an inclinometer, a magnetometer, a rotary encoder, a pose sensor, or any other type of sensor suitable to detect the movement and/or angle of controllers 650a, 650b when held by the operator. As described above, each utility arm 330a, 330b of robot unit 302 may also comprise at least one sensor, including a gyroscope, a light sensor, an inclinometer, a magnetometer, a rotary encoder, a pose sensor, or any other type of sensor suitable to detect the movement and/or angle of utility arm 330a, 330b. Like head mount 602 described above, a plurality of sensors 662 may be utilized in various locations to include redundancy or to increase accuracy. For example, an accelerometer may be used to detect an acceleration signal, the acceleration signal may be integrated yield a velocity signal which may then be compared to a velocity signal detected by a gyroscope, wherein each of the accelerometer and the gyroscope use a light sensor as a reference. Sensors on robot unit 302 may be used to collect sensory information or as a part of the control process to adjust utility arm 330a, 330b in order to match the movement and/or angle of the arm and/or hand of the operator. For example, a first accelerometer may be placed in each of controllers 650a, 650b to sense the movement of controllers 650a, 650b and a second accelerometer may be disposed in or on a utility arm 330a, 330b to sense movement of the utility arm 330a, 330b. The readings of the first accelerometer and the second accelerometer may be compared and used by the computer 260. In some embodiments, the computer 260 may use the data from the second accelerometer as a feedback signal to control movement of the utility arm 330a, 330b.

Controllers 650a, 650b may further comprise a transceiver 664 adapted and configured for transmitting sensor data, including movement or angle information captured by sensor 662 disposed within controller 650a, 650b. Transceiver 664 may be the same transceiver 292 as described above with respect to FIG. 2. Like transceiver 610 with respect to head mount 602, transceiver 664 may be in communication with the transceiver 250 associated with computer 260 for transmitting the captured sensor data corresponding to the movement of controllers 650a, 650b and/or the angle of controllers 650a, 650b. Computer 260 may compare the received sensor data from controller 650a, 650b with the generated three-dimensional representation to determine a movement of the utility arms 330a, 330b based on both the received sensor data and the three-dimensional representation. The computer 260 may then send instructions or commands to robot unit 302 to rotate or move one or more of utility arms 330a, 330b based on the angle or movement of controllers 650a, 650b.

In some embodiments, a plurality of head mounts 602 and/or controllers 650a, 650b may be utilized. For example, as described above, an operator may toggle between control of various portions of system 300 through selective toggling or commands. In some embodiments, an operator may additionally and/or optionally toggle head mount 602 and/or controllers 650a, 650b to different control modes. For example, an operator may selectively toggle to an observer mode, in which sensory data may be sent to head mount 602, but the operator's movement, angle, and viewing angle are not recorded and are not sent to system 300. For example, a supervisor may wear a head mount 602 to monitor a subordinate as the subordinate is operating robot unit 302. In further embodiments, an operator having pre-approved credentials may toggle to a rescue mode or other overriding mode to take over control of system 300 from another operator. Continuing with the example above, a supervisor viewing the subordinate may determine the subordinate is about to make a mistake or perform a task incorrectly. The supervisor may toggle control to the supervisor's head mount 602 and controllers 650a, 650b, automatically switching the subordinate to an observer mode, and take control or system 300 from the subordinate. Even further, it may be advantageous for multiple operators to simultaneously control certain parts of system 300. For example, a first operator may control robot unit 302 and a second operator may control arm 390. Accordingly, the two operators may work in tandem, each controlling a different aspect of system 300 simultaneously.

Figure 7:
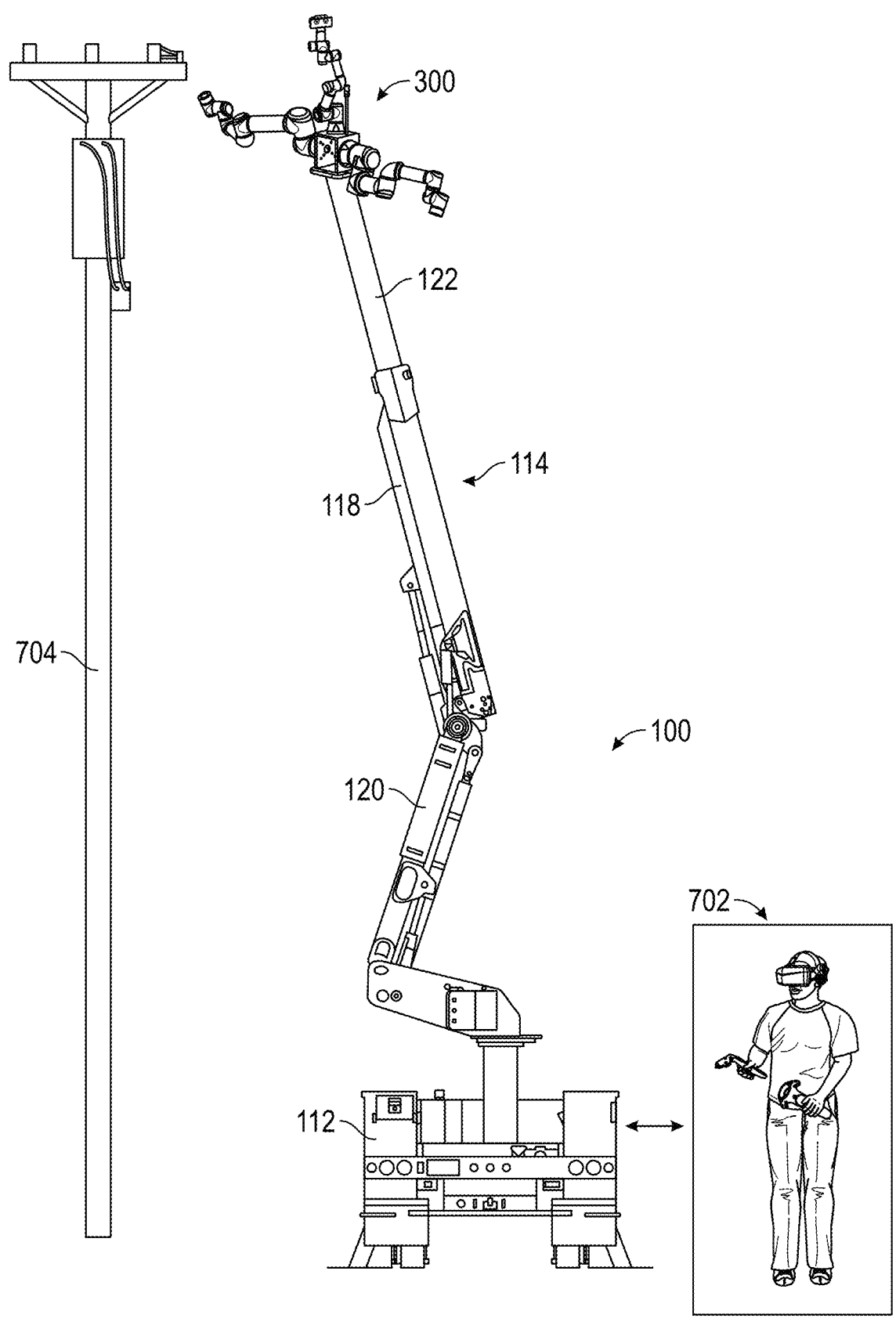
FIG. 7 depicts an exemplary operation of the aerial device for some embodiments.

FIG. 7 depicts an exemplary operation of the robot unit for some embodiments of the present disclosure. In such embodiments, the aerial device 100 of FIG. 1 may be included which comprises the utility vehicle 112, the boom assembly 114, and remote assembly system 300. In some embodiments, the aerial device 100 may be an insulated aerial device with at least a portion of the aerial device 100 being electrically insulated such that electricity is not transmitted through said portion of the aerial device. In some embodiments, the remote assembly system 300 further comprises at least one sensory device, such as remote capture device 210, to collect additional information to be communicated to the head mount 602. For example, remote capture device 210 may comprise one or more sensors 220, which may be any of a voltmeter, a strain gauge, and any other instrument for collecting additional information. The sensory information may be sent to the head mount 602 as part of the HUD. In some embodiments, the remote assembly system 300 further comprises a transceiver 244, as described above with respect to FIG. 2. The transceiver 244 is operable to transmit and receive a wireless signal which may perform a function, such as sending sensory information or receiving instructions for remote assembly system 300. Additionally, as further depicted in the exemplary use case of FIG. 7, remote assembly system 300 may be used to work on powerlines or other scenarios involving live electrical lines. Accordingly, in some embodiments, one or more assemblies, sub-assemblies, parts, or components of remote assembly system 300 may be at least partially constructed from an electric resistant material or may incorporate electric resistant material. Construction of an electric resistant material may protect one or more portions of remote assembly system 300 from damage from a live power line.

Accordingly, in some embodiments, the operator may be located at a remote location 702. As described above, it may be advantageous for an operator to be located at a different location than aerial device 100 for a number of reasons, such as safety concerns or convenience for the operator. Remote location 702 may be any location that is a predetermined distance away from the robot unit 302. For example, in some embodiments, the operator may be inside of the utility vehicle 112, such as in the cab of a work truck, a cab attached to the turntable of the boom assembly 114, similar to a crane device, or an adjacent support trailer or support vehicle. In further embodiments, the operator may be located within a building located near the worksite. In even further embodiments, the operator may be located within a building located miles away from the worksite. It will be appreciated that the distance between robot unit 302 and the operator is theoretically limitless, and as long as remote assembly system 300 and operator are communicatively coupled, remote location 702 can be any location. Accordingly, an operator utilizing control system 280 may receive sensory information and provide instructions for remote assembly system 300 while in relative safety.

During operation, the utility vehicle 112 of the aerial device 100 may be driven to a location and positioned adjacent to a utility pole 704 which supports an energized power line, transformer, or other telecommunication or powerline components. The boom 118 is then raised such that the distal end with the coupled remote assembly system 300 approaches the top of the utility pole 704. After positioning remote assembly system 300, the operator may operate remote assembly system 300 using control system 280 viewing and hearing the operation of the system 300. For example, video captured by system 300 may be displayed on head mount 602. The operator is able to look around at various points by turning the operator's head. The viewing angle of the operator is detected by the sensor 608 on the head mount 602 and communicated from the transceiver 610 to the system 300 to adjust the remote capture device 210 of robot unit 302 in order to match the operator's viewing angle. Additionally, the operator is further able to manipulate one or more utility arms 330a, 330b of remote assembly via controllers 650a, 650b. The movement of the operator is detected by the sensors 662 of controllers 650a, 650b and communicated from the transceiver 664 to the system 300 to adjust the movement or positioning of utility arms 330a, 330b. Accordingly, while in the relative safety of remote location 702, an operator is able to receive sensory information and provide instruction to system 300.

Figure 8:
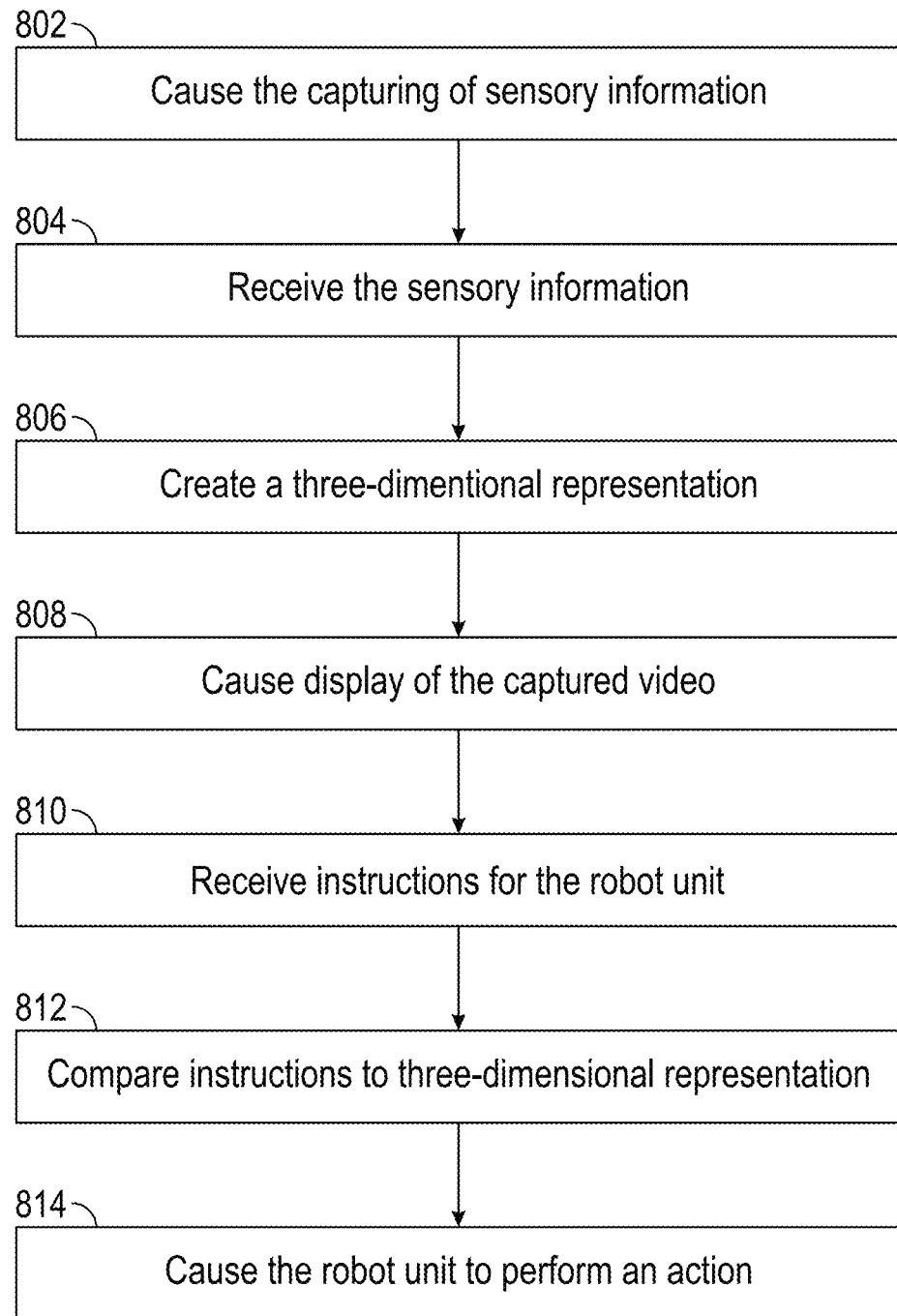
FIG. 8 is a flow diagram depicting method steps for some embodiments.

FIG. 8 depicts a flow diagram having process steps relating to some embodiments of the present disclosure. At step 802, sensory information may be collected by remote assembly 202. For example, sensory information may be collected by remote capture device 210. The sensory information may be collected using any of the cameras 212, three-dimensional cameras 216, microphones 218, and/or sensors, and/or any other suitable recording device. In some embodiments, the sensory information comprises video sensory information and three-dimensional sensory information. Alternatively, or additionally, the sensory information may comprise haptic information or any other type of sensory information described herein or incorporated by reference. In some embodiments, the sensory information is collected as an analog signal and converted to a digital signal using an analog (A/D) converter. The sensory information may be compiled into the digital hub 222 to create a combined digital signal associated with the sensory information.

At step 804, the captured sensory information may be received and processed by computer 260. In some embodiments, remote assembly 202 may transmit the collected sensory information and transmit the sensory information to computer 260 for later analysis or processing. In some embodiments, the sensory information may be wirelessly transmitted by remote assembly 202 and received by computer 260. In further embodiments, the sensory information may be directly transmitted by remote assembly 202 and received by computer 260 by a direct means, such as a fiber optic cable, ethernet cable, or USB cable. In some embodiments, the received sensory information may be processed at computer 260 by processor 262. For example, during processing, the sensory information may be processed in order to stitch together a plurality of images from the sensory information into a stitched image or a single video file. The processing may further comprise a step of selecting a portion of the stitched image associated with the viewing angle of the user and interpolating between visual information of the sensory information to select a portion of visual information associated with the viewing angle of the operator. In some embodiments, only a portion of the sensory information is processed. The processing may also include audio stitching and interpolation. It should be understood that the audio stitching and interpolation may be optimized. For example, in some embodiments, only a select portion of the audio sensory information associated with the viewing parameter of the operator is processed and stitched. In some embodiments, the processing of sensory information may also include determining which sensory information will be transmitted to the display for viewing by the operator. For example, as described above, the remote assembly 202 may comprise a plurality of cameras 212 for capturing video information. In some embodiments, one or more cameras 212 may be used to capture video of the surrounding area of the remote assembly 202 in addition to capturing video of the specific job area. Such additional video capture may be useful for monitoring the surrounding area for obstacles or other hazards.

At step 806, computer 260 may utilize the processed sensory information to create or generate a three-dimensional representation. In some embodiments, the three-dimensional representation may be representation of an object or area captured by the three-dimensional camera 216 of remote capture device 210. The three-dimensional information captured, received, and processed by computer 260 may be utilized to create a three-dimensional representation. The three-dimensional representation may be a point-cloud, three-dimensional model, or other computer-generated model based on the three-dimensional information. The three-dimensional representation may comprise depth information related to the three-dimensional depth of the captured object or area.

At step 808, computer 260 may cause the display of captured video, audio, and/or other sensory information captured by remote capture device 210. For example, computer 260 may transmit the processed signal as described above with respect to step 804 to display 288 of control system 280. Once transmitted to display 288, a user or operator may view at least a portion of the captured sensory information, including video captured by camera 212.

At step 810, the computer may receive instruction for the remote assembly 202 from a user or operator. For example, after being provided with sensory information, the user or operator may input a command or instruction for remote assembly 202 to perform a movement, task, or other action. For example, as described above with respect to FIGS. 6A-6B, instructions or commands may be inputted through a head mount 602 and/or controllers 650a, 650b. Each of head mount 602 and controllers 650a, 650b may comprise sensors for tracking and mapping the movement of the operator. It should be understood that the instructions may be any of the instructions or commands described above.

At step 812, the computer 260 may compare the received instructions from the operator to the generated three-dimensional representation. For example, the sensory information provided to the computer 260 may be an instruction from the operator for the remote assembly 202 to move a utility arm to position a utility tool to unwind a wire on a power line. Computer 260 may compare the received instructions to the generated three-dimensional representation and determine how the robot should move to perform the instructions from the operator. For example, when comparing the three-dimensional representation to the received instructions, computer 260 may determine the distance a utility arm 330a, 330b should move to align a utility tool with the wire. Step 812 may optionally and/or additionally comprise an optional step of comparing the received instruction with additional sensory information. For example, as described above, a plurality of cameras 212 may be positioned and utilized to capture a video of the area surrounding robot unit 302. In addition to comparing the instructions to the three-dimensional representation, computer 260 may further compare the instructions to the surrounding area to robot unit 302. For example, during extended control of robot unit 302, the surrounding area may change. For example, a non-operator may move into the surrounding area, or a tree branch may fall and come to close proximity to robot unit 302. Computer 260 may monitor the surrounding area to make a determination as to whether a movement of robot unit 302 would cause a collision with an object near robot unit 302. Accordingly, computer 260 may modify instructions or commands from an operator to cause robot unit 302 to move in a manner to avoid collision with another object, including objects that an operator may not be aware of.

At step 814, the computer 260 may cause the robot unit 302 to perform an action. In some embodiments, the action may be a movement of camera mount 310, utility arms 330a, 330b, or another portion of robot unit 302 or system 300. In further embodiments, the action may be an instruction for robot unit 302 to capture sensory information. It should be understood that the action may be any action described above or any other action that robot unit 302, arm 390, or any other part, component, assembly, or sub-assembly of system 300 may perform. In some embodiments, the action may be based at least partially on the instructions from the operator and the comparison between the received instructions with the three-dimensional representation. Accordingly, in some embodiments, there may be an analysis and comparison of the instructions provided by an operator prior to execution of the instructions by robot unit 302.

In some embodiments, one or more of the steps described above may be performed in parallel and are not necessarily performed in sequential steps. For example, steps 802-808 may be performed in parallel with steps 810-814 if only visual feedback is captured and provided to an operator.

Figure 9:
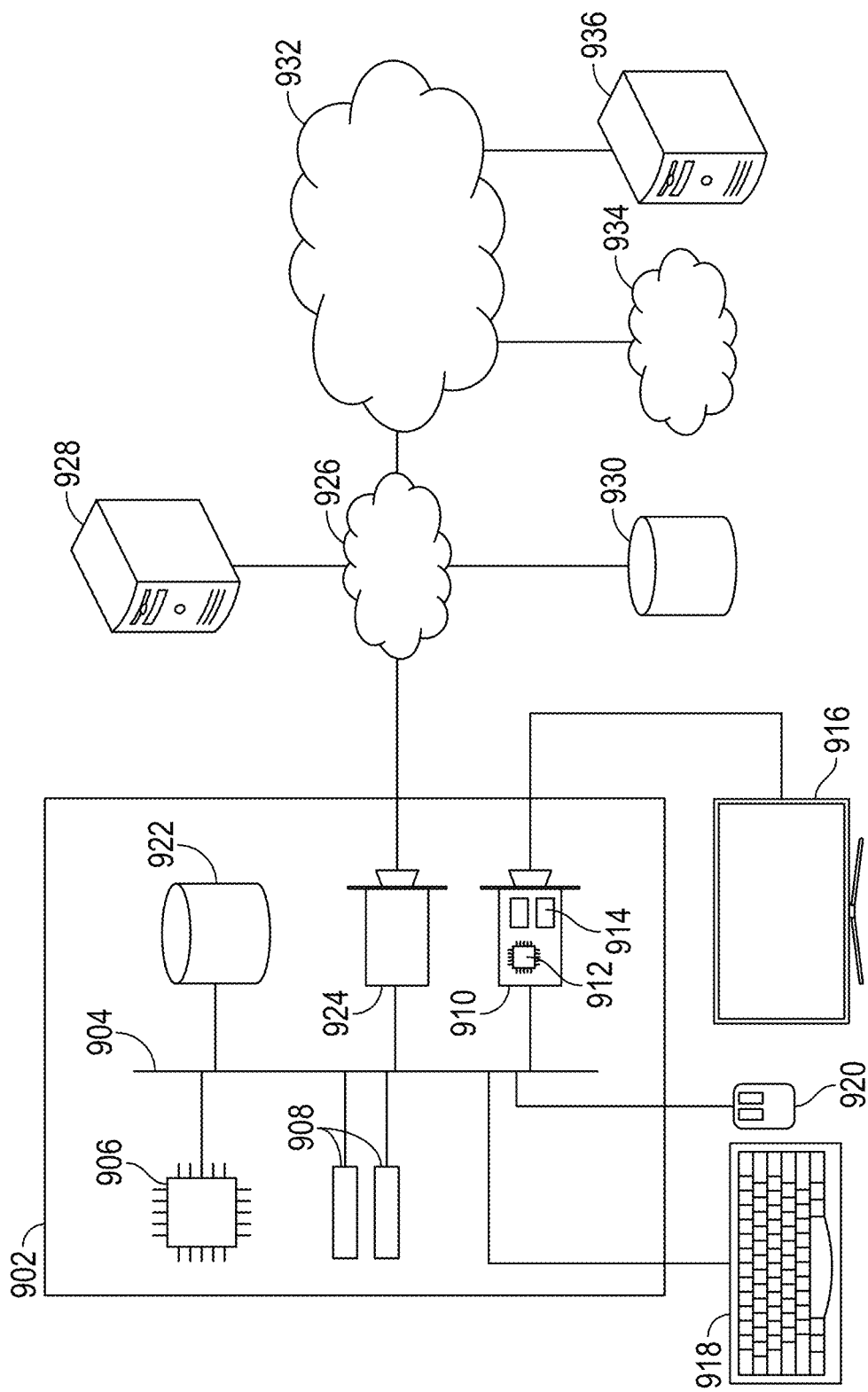
FIG. 9 is a hardware platform for some embodiments.

In FIG. 9, an exemplary hardware platform for certain embodiments of the present disclosure is depicted. Computer 902 can be a desktop computer, a laptop computer, a server computer, a mobile device such as a smartphone or tablet, or any other form factor of general- or special-purpose computing device. Depicted with computer 902 are several components, for illustrative purposes. In some embodiments, certain components may be arranged differently or absent. Additional components may also be present. Included in computer 902 is system bus 904, whereby other components of computer 902 can communicate with each other. In certain embodiments, there may be multiple busses or components may communicate with each other directly. Connected to system bus 904 is central processing unit (CPU) 906. Also attached to system bus 904 are one or more random-access memory (RAM) modules 908. Also attached to system bus 904 is graphics card 910. In some embodiments, graphics card 910 may not be a physically separate card, but rather may be integrated into the motherboard or the CPU 906. In some embodiments, graphics card 910 has a separate graphics-processing unit (GPU) 912, which can be used for graphics processing or for general purpose computing (GPGPU). Also on graphics card 910 is GPU memory 914. Connected (directly or indirectly) to graphics card 910 is display 916 for user interaction. In some embodiments, no display is present, while in others it is integrated into computer 902. Similarly, peripherals such as keyboard 918 and mouse 920 are connected to system bus 904. Like display 916, these peripherals may be integrated into computer 902 or absent. Also connected to system bus 904 is local storage 922, which may be any form of computer-readable media and may be internally installed in computer 902 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cables. Examples of stored information include computer-usable instructions, data structures, program modules, and other data representations.

Finally, network interface card (NIC) 924 is also attached to system bus 904 and allows computer 902 to communicate over a network such as network 926. NIC 924 can be any form of network interface known in the art, such as Ethernet, ATM, fiber, Bluetooth, or Wi-Fi (i.e., the IEEE 802.11 family of standards). NIC 924 connects computer 902 to local network 926, which may also include one or more other computers, such as computer 928, and network storage, such as data store 930. Generally, a data store such as data store 930 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 928, accessible on a local network such as local network 926, or remotely accessible over Internet 932. Local network 926 is in turn connected to Internet 932, which connects many networks such as local network 926, remote network 934 or directly attached computers such as computer 936. In some embodiments, computer 902 can itself be directly connected to Internet 932.

It should be understood that, in some embodiments, the computer 902 may be the computer 260 and/or control system 280 described in reference to FIG. 2 and may perform similar operations. Similarly, the CPU 906 may be processor 262 and/or processor 282 described above. Additionally, instructions to perform any of the steps described in reference to FIG. 8 may be stored on the local storage 922.

(A1) A robot unit, the robot unit comprising: a base for mounting the robot unit to a distal end of a boom assembly, at least one utility arm for performing an action, a remotely controlled movable camera mount, at least one camera disposed on the camera mount to capture visual information, at least one depth camera disposed on the camera mount to capture three-dimensional depth information, at least one remote power source for powering the at least one camera and the at least one depth camera, and a transmitter for transmitting a signal including the visual information and the three-dimensional depth information to a hardware comprising a processor. The processor comprising computer-readable instruction for performing: receiving the visual information and the three-dimensional depth information and creating a three-dimensional representation based at least in part on the visual information or the three-dimensional depth information, receiving an instruction for the robot unit to perform an action, responsive to receiving the instruction, comparing the instruction to the three-dimensional representation, and causing the robot unit to perform the action based at least in part on the instruction and a comparison of the instruction to the three-dimensional representation.

(A2) The robot unit denoted as (A1), wherein the boom-mounted robot comprises two utility arms, wherein each of the two utility arms are configured for moving with six degrees of freedom.

(A3) The robot unit denoted as (A1) or (A2), wherein the camera mount is configured for moving with six degrees of freedom.

(A4) The robot unit denoted as (A1) through (A3), wherein at least one of the utility arm or the camera mount is at least partially constructed from an electric resistant material.

(A5) The robot unit denoted as any of (A1) through (A4), further comprising a plurality of cameras to capture visual information of a plurality of fields of view.

(A6) The robot unit denoted as any of (A1) through (A5) further comprising at least one sensor, wherein the at least one sensor is an electrical sensor.

(A7) The robot unit denoted as any of (A1) through (A6), wherein a proximal end of the boom assembly is attached to a utility vehicle.

(B1) A system for controlling a robot unit, the system comprising: A robot unit, a control unit, and a processor. The robot unit comprising: a base for mounting the robot unit to a boom assembly, a camera mount, at least one camera disposed on the camera mount to capture visual information, and at least one depth camera disposed on the camera to capture three-dimensional depth information. The control unit comprising: a display for displaying the visual information, and a controller for inputting instructions for the robot unit. The processor comprising computer readable instructions for performing: transmit the visual information to the display of the control unit, receive the three-dimensional depth information and create a three-dimensional representation of an object based at least in part on the three-dimensional depth information, receive an instruction for the robot unit, responsive to receiving the instruction, comparing the instruction to the three-dimensional representation, and cause the robot unit to perform an action based at least in part on the instruction and the comparing of the instruction to the three-dimensional representation.

(B2) The system denoted as (B1), wherein the robot unit further comprises: a first utility arm and a second utility arm, and wherein the controller of the control unit comprises a first hand-held controller a second hand-held controller, wherein the first hand-held controller controls the first utility arm, and the second hand-held controller controls the second utility arm.

(B3) The system denoted as (B1) or (B2), wherein each of the first hand-held controller and the second hand-held controller comprise at least one sensor for recording movement data and angle data.

(B4) The system denoted as any of (B1) through (B3), wherein the display is disposed on a head mount for placement on a head of an operator.

(B5) The system denoted as any of (B1) through (B4), wherein the head mount comprises at least one sensor for recording a viewing angle of the operator, a movement data of the operator, and an angle data of the operator.

(B6) The system denoted as any of (B1) through (B5), wherein the camera mount is configured to adjust in position based at least in part on the viewing angle, movement data, and angle data of the operator.

(B7) The system denoted as any of (B1) through (B6), wherein the first hand-held controller comprises a first transceiver, the second hand-held controller comprises a second transceiver, and the head mount comprises a third transceiver, and wherein each of the first transceiver, second transceiver, and third transceiver are configured for transmitting information to the robot unit.

(C1) A method for controlling a robot unit, the method comprising: causing a capturing of sensory information from at least one capture device disposed on a robot unit, wherein the sensory information comprises video captured from at least one camera and three-dimensional depth information captured from a three-dimensional depth camera; receiving the sensory information and creating a three-dimensional representation of an object based at least in part on the three-dimensional depth information; causing display of the video captured from the at least one camera on a display of a control system; receiving an instruction for the robot unit to perform an action from a user associated with the control system; responsive to receiving the instruction, comparing the instruction to the three-dimensional representation; and causing the robot unit to perform the action based at least in part on the instruction and a comparison of the instruction to the three-dimensional representation.

(C2) The method denoted as (C1), further comprising transmitting the sensory information to a computer, wherein the computer generates the three-dimensional representation, the wherein the three-dimensional representation is a point cloud.

(C3) The method denoted as (C1) or (C2), wherein the sensory information includes a of video information captured from a plurality of cameras.

(C4) The method denoted as any of (C1) through (C3), further comprising stitching the video information into a single video file.

(C5) The method denoted as any of (C1) through (C4), wherein the sensory information includes audio information captured from at least one microphone.

(C6) The method denoted as any of (C1) through (C5), further comprising providing the audio information to an operator via at least one speaker.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,710, titled "AUTONOMOUS AND SEMI-AUTONOMOUS CONTROL OF AERIAL ROBOTIC SYSTEMS"; U.S. application Ser. No. 17/875,743, titled "COORERATIVE HIGH-CAPACITY AND HIGH-DEXTERITY MANIPULATORS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,893, titled "COORDINATE MAPPING FOR MOTION CONTROL"; U.S. application Ser. No. 17/875,943, titled "WIRE TENSIONING SYSTEM"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

The invention claimed is:
1. A robotic unit comprising:
a base for receiving one or more components of the robotic unit;
at least one utility arm operatively coupled to the base;
a camera unit operatively coupled to the base, the camera unit comprising at least one camera for capturing visual information and at least one three-dimensional camera for capturing three-dimensional depth information;
a transmitter for transmitting a signal including the visual information and the three-dimensional depth information;
at least one processor; and
at least one non-transitory computer-readable media storing computer-executable instructions that, when executed by the at least one processor, causes the robotic unit to carry out actions, comprising:
receiving the visual information and the three-dimensional depth information;
creating a three-dimensional representation based at least in part on the visual information or the three-dimensional depth information;
transmitting the visual information and the three-dimensional depth information to a control system comprising at least one hand-held controller and a head-mounted controller with a display, the at least one hand-held controller and the head-mounted controller configured to capture movement and position of an inputting user;
receiving a user instruction to perform an action,
wherein the user instruction comprises a user movement that is captured by the at least one hand-held controller or by the head-mounted controller, and
wherein the action is a replication of the user movement;
responsive to receiving the user instruction, modifying the user instruction to generate a modified action based on a first comparison of the user instruction to the three-dimensional representation or on a second comparison of the user instruction to the visual information; and
performing the modified action.

2. The robotic unit of claim 1, further comprising:
one or more additional cameras, wherein the one or more additional cameras capture additional visual information from a different field of view from the at least one camera of the camera unit,
wherein the three-dimensional representation includes the additional visual information.

3. The robotic unit of claim 2, wherein the additional visual information comprises a three hundred-sixty-degree field of view.

4. The robotic unit of claim 2, wherein the actions further comprise:
determining, prior to performing the user instruction, obstacle information based on the user instruction and a comparison of the user instruction to the three-dimensional representation; and
transmitting the obstacle information to the control system.

5. The robotic unit of claim 1,
wherein the user instruction is a first user instruction, wherein the actions further comprise:
responsive to receiving a second user instruction from the control system, overriding the first user instruction,
wherein the second user instruction comprises an input from the at least one hand-held controller; and
transmitting the second user instruction to the at least one utility arm.

6. The robotic unit of claim 1,
wherein the user instruction is a first user instruction, and wherein the actions further comprise:
  responsive to receiving a second user instruction, causing the robotic unit to perform at least one automated action.

7. The robotic unit of claim 6, wherein the at least one automated action is performed by the at least one camera.

8. A robotic system comprising:
  a robot unit comprising:
    a base;
    a first utility arm;
    a second utility arm;
    at least one camera configured to capture visual information;
    at least one depth camera configured to capture three-dimensional depth information; and
  a control unit comprising:
    a display for displaying the visual information;
    at least one controller for inputting instructions for the robot unit;
    at least one processor; and
    one or more non-transitory computer-readable media storing computer-executable instructions that, when executed by the at least one processor, cause the at least one processor to:
      cause display of the visual information on the display;
      receive the three-dimensional depth information and create a three-dimensional representation of an object based at least in part on the three-dimensional depth information;
      receive a control mode instruction to select a control mode of a plurality of control modes;
      update the display based at least in part on the control mode;
      receive a user instruction for the robot unit to perform an action,
        wherein the user instruction comprises a user movement that is input via the at least one controller, and
        wherein the action is a replicated action of the user movement;
      responsive to receiving the user instruction, perform a comparison of the user instruction to the three-dimensional representation,
      modify, based on the comparison of the user instruction to the three-dimensional representation, the user instruction to obtain a modified action; and
      cause the robot unit to perform the modified action based at least in part on the control mode.

9. The robotic system of claim 8,
  wherein the at least one controller comprises a head-mounted controller and a hand-held controller, and
  wherein the head-mounted controller controls the at least one camera, and the hand-held controller controls the first utility arm.

10. The robotic system of claim 8, wherein the control mode disables receiving the user instruction for the second utility arm.

11. The robotic system of claim 8,
  wherein the at least one camera comprises a first camera and a second camera,
  wherein the visual information is a first visual information comprising data captured from the first camera, and
  wherein the computer-executable instructions further cause the at least one processor to:
    responsive to receiving the user instruction, transmit a second visual information comprising data captured from the second camera.

12. The robotic system of claim 8, wherein the plurality of control modes comprises a boom control mode, a strong arm control mode, and a plurality of robot unit control modes.

13. The robotic system of claim 12, wherein the plurality of robot unit control modes comprises an observer mode and a plurality of tool modes.

14. The robotic system of claim 13, wherein the observer mode disables receiving the user instruction for the first utility arm and the second utility arm.

15. The robotic system of claim 8,
  wherein the first utility arm comprises an adapter located at a distal end of the first utility arm for selectively and interchangeably equipping at least one tool from a plurality of tools to the first utility arm for performing a plurality of functions, and
  wherein the robot unit further comprises:
    a holder carousel for storing the plurality of tools, and
    wherein the first utility arm interacts with the holder carousel for equipping the at least one tool to the adapter.

* * * * *